US009650450B2

(12) United States Patent
Chiefari et al.

(10) Patent No.: US 9,650,450 B2
(45) Date of Patent: May 16, 2017

(54) RAFT POLYMERS

(71) Applicant: COMMONWEALTH SCIENTIFIC AND INDUSTRIAL RESEARCH ORGANISATION, Campbell (AU)

(72) Inventors: John Chiefari, Heathmont (AU); Christian Hornung, Balaclava (AU); Almar Postma, Balwyn (AU); Simon Saubern, Clifton Hill (AU)

(73) Assignee: COMMONWEALTH SCIENTIFIC AND INDUSTRIAL RESEARCH ORGANISATION, Campbell (AU)

(*) Notice: Subject to any disclaimer, the term of this patent is extended or adjusted under 35 U.S.C. 154(b) by 0 days.

(21) Appl. No.: 14/365,551

(22) PCT Filed: Dec. 14, 2012

(86) PCT No.: PCT/AU2012/001542
§ 371 (c)(1),
(2) Date: Jun. 13, 2014

(87) PCT Pub. No.: WO2013/086585
PCT Pub. Date: Jun. 20, 2013

(65) Prior Publication Data
US 2014/0350182 A1    Nov. 27, 2014

(30) Foreign Application Priority Data
Dec. 14, 2011  (AU) .................................. 2011905215

(51) Int. Cl.
| | | |
|---|---|---|
| *C08F 8/00* | (2006.01) | |
| *C08F 6/06* | (2006.01) | |
| *B01J 19/24* | (2006.01) | |
| *C08F 2/38* | (2006.01) | |
| *C08F 6/02* | (2006.01) | |
| *C08F 6/10* | (2006.01) | |
| *C08F 8/04* | (2006.01) | |
| *C08F 8/12* | (2006.01) | |

(52) U.S. Cl.
CPC .............. *C08F 8/00* (2013.01); *B01J 19/242* (2013.01); *B01J 19/243* (2013.01); *B01J 19/2425* (2013.01); *C08F 2/38* (2013.01); *C08F 6/02* (2013.01); *C08F 6/10* (2013.01); *C08F 8/04* (2013.01); *C08F 8/12* (2013.01); *C08F 6/06* (2013.01); *C08F 2438/03* (2013.01); *C08F 2810/30* (2013.01); *C08F 2810/40* (2013.01)

(58) Field of Classification Search
CPC ...... C08F 8/00; C08F 8/04; C08F 8/12; C08F 8/26; C08F 6/02; C08F 6/06; C08F 6/08; C08F 2/38; C08F 2810/30; C08F 2810/40; C08F 2438/03; B01J 19/2425; B01J 19/242; B01J 19/243

USPC ................................................ 525/52, 326.1
See application file for complete search history.

(56) References Cited

U.S. PATENT DOCUMENTS

| | | | | |
|---|---|---|---|---|
| 4,637,857 A | * | 1/1987 | Brockmann ............. | B01D 1/14 |
| | | | | 159/47.1 |
| 2007/0027266 A1 | * | 2/2007 | Zard ......................... | C08F 8/06 |
| | | | | 525/330.3 |

FOREIGN PATENT DOCUMENTS

| | | |
|---|---|---|
| AU | 2004283926 | 5/2005 |
| WO | WO 98/01478 | 1/1998 |
| WO | WO 99/31144 | 6/1999 |
| WO | WO 2004/089994 | 10/2004 |
| WO | WO 2007/100719 | 9/2007 |
| WO | WO 2008/103144 | 8/2008 |
| WO | WO 2010/083569 | 7/2010 |
| WO | WO 2012/037596 | 3/2012 |

OTHER PUBLICATIONS

Diehl et al., Macromolecules 43 (2010) 10311-10314.*
Moad et al., Polymer 49 (2008) 1079-1131.*
Hornung et al., Org. Proc. Res. Dev. 15 (2011) 593-601.*
Smulders et al., AIChE Journal 51 (2005) 1009-1021.*
Chong et al., "Thermolysis of RAFT-Synthesized Poly(Methyl Methacrylate)," Aust. J. Chem., 2006, pp. 755-762, vol. 59.
Diehl et al., "Accelerated Continuous Flow RAFT Polymerization," Macromolecules, Dec. 28, 2010, pp. 10311-10314, vol. 43(24) [abstract only].
Hornung et al., "A Continuous Flow Process for the Radical Induced End Group Removal of RAFT Polymers," Macromolecular Reaction Engineering, Jun. 21, 2012, pp. 246-251, vol. 6 [abstract only].
Hornung et al., "Controlled RAFT Polymerization in a Continuous Flow Microreactor," Org. Process Res. Dev., May 20, 2011, pp. 593-601, vol. 15(3) [abstract only].
Moad et al., "End-functional polymers, thiocarbonylthio group removal/transformation and reversible addition—fragmentation— chain transfer (RAFT) polymerization," Polym. Int., 2011, pp. 9-25, vol. 60(1) [abstract only].

(Continued)

*Primary Examiner* — Roberto Rabago
(74) *Attorney, Agent, or Firm* — Davis Wright Tremaine LLP

(57) ABSTRACT

The invention provides for a process for removing thiocarbonylthio groups from polymer prepared by RAFT polymerization, the process comprising:

introducing into a flow reactor a solution comprising the RAFT polymer in solvent; and promoting a reaction within the flow reactor that removes the thiocarbonylthio groups so as to form a solution that flows out of the reactor comprising the RAFT polymer absent the thiocarbonylthio groups.

9 Claims, 9 Drawing Sheets

(56) References Cited

OTHER PUBLICATIONS

Moad et al., "Radical addition—fragmentation chemistry in polymer synthesis," Polymer, Mar. 3, 2008, pp. 1079-1131, vol. 49(5).
Patent Cooperation Treaty, "International Preliminary Report on Patentability and Written Opinion" in corresponding International application No. PCT/US2012/001542, mailed Jun. 17, 2014, 6 pgs.
Patent Cooperation Treaty, "International Search Report" in corresponding International application No. PCT/US2012/001542, mailed Feb. 7, 2013, 5 pgs.
Postma et al., "Thermolysis of RAFT-synthesized polymers. A convenient method for trithiocarbonate group elimination," Macromolecules, Jan. 1, 2005, pp. 5371-5374, vol. 38(13).
Vandenbergh et al., "Use of a continuous-flow microreactor for thiol-ene functionalization of RAFT-derived poly(butyl acrylate)," Polym. Chem., 2012, pp. 2739-2742, vol. 3(10) [abstract only].
Willcock et al., "End group removal and modification of RAFT polymers," Polym. Chem, 2010, pp. 149-157, vol. 1 [abstract only].
Chong et al., "Thiocarbonylthio End Group Removal from RAFT-Synthesized Polymers by Radical-Induced Reduction," Macromolecules, 40(13), 2007, pp. 4446-4455.
Extended European Search Report issued by the European Patent Office in European Patent Application No. 12857302.9, mailed Jun. 22, 2015, 4 pages.

* cited by examiner

RAFT POLYMERS

CROSS-REFERENCE TO RELATED APPLICATIONS

The present application is a U.S. National Stage entry under 35 U.S.C. §371 of International Application No. PCT/AU2012/001542, filed on Dec. 14, 2012, designating the United States of America and published in English on Jun. 20, 2013, which in turn claims priority to Australian Application No. 2011905215, filed on Dec. 14, 2011, each of which is hereby incorporated by reference in its entirety.

FIELD OF THE INVENTION

The present invention relates in general to polymers that have been prepared by Reversible Addition-Fragmentation chain Transfer (RAFT) polymerisation. In particular, the invention relates to a process for removing thiocarbonylthio groups from RAFT polymers.

BACKGROUND OF THE INVENTION

RAFT polymerisation, as described in International Patent Publication Nos. WO 98/01478, WO 99/31144 and WO 10/83569, is a polymerisation technique that exhibits characteristics associated with living polymerisation. Living polymerisation is generally considered in the art to be a form of chain polymerisation in which irreversible chain termination is substantially absent. An important feature of living polymerisation is that polymer chains will continue to grow while monomer is provided and the reaction conditions to support polymerisation are favourable. Polymers prepared by RAFT polymerisation can advantageously exhibit a well defined molecular architecture, a predetermined molecular weight and a narrow molecular weight distribution or low polydispersity.

RAFT polymerisation is believed to proceed under the control of a RAFT agent according to a mechanism which is simplistically illustrated below in Scheme 1.

Scheme 1: Proposed mechanism for RAFT polymerisation, where M represents monomer, $P_n$ represents polymerised monomer, and Z and R are as defined below.

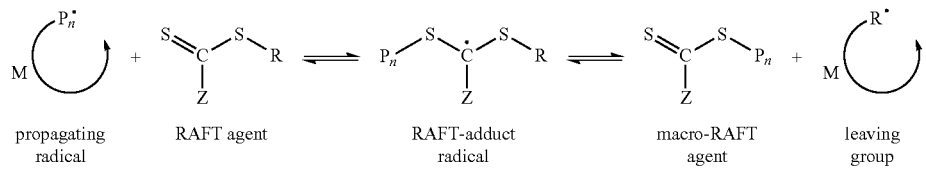

propagating radical | RAFT agent | RAFT-adduct radical | macro-RAFT agent | leaving group Scheme 1:
Proposed mechanism for RAFT polymerisation, where M represents monomer, $P_n$ represents polymerised monomer, and Z and R are as defined below.

With reference to Scheme 1, R represents a group that functions as a free radical leaving group under the polymerisation conditions employed and yet, as a free radical leaving group, retains the ability to reinitiate polymerisation. Z represents a group that functions to convey a suitable reactivity to the C=S moiety in the RAFT agent towards free radical addition without slowing the rate of fragmentation of the RAFT-adduct radical to the extent that polymerisation is unduly retarded.

RAFT polymerisation is one of the most versatile methods of controlled radical polymerisation at least in part because of its ability to be performed using a vast array of monomers and solvents, including aqueous solutions.

Again with reference to Scheme 1, polymers produced by RAFT polymerisation, commonly referred to as RAFT polymers, inherently comprise a covalently bound residue of the RAFT agent. The RAFT agent residue itself comprises a thiocarbonylthio group (i.e. —C(S)S—) which may, for example, be in the form of a dithioester, dithiocarbamate, trithiocarbonate, or xanthate group.

In the practical application of RAFT polymers it may be desirable to remove the thiocarbonylthio group from the polymer per se. For example, the presence of the thiocarbonylthio group can cause unwanted colour in the polymer. The thiocarbonylthio group can also degrade over time to release odorous volatile sulphur containing compounds.

Even though concern over the presence of the thiocarbonylthio groups can be largely mitigated or overcome by suitable selection of the initial RAFT agent, there has been some incentive to develop techniques for removing thiocarbonylthio groups from RAFT polymers. In some circumstances, it may be necessary or desirable to deactivate the thiocarbonylthio groups due to their reactivity or to transform the groups for use in subsequent processing.

The batch wise treatment of RAFT polymer with various reagents such as nucleophiles, ionic reducing agents, oxidising agents, or treatments such as thermolysis and irradiation has been shown to remove thiocarbonylthio groups. For example, in combination with a free radical initiator, hypophosphite compounds have been shown to desulphurise RAFT polymer through radical induced reduction of the thiocarbonylthio groups. Nucleophiles such as amines have also been shown to convert thiocarbonylthio groups into thiol groups.

However such techniques can be prone to relatively poor process control and reaction uniformity leading to deficiencies in the resulting modified polymer quality. Accordingly, there remains an opportunity to develop an effective and efficient process for removing thiocarbonylthio groups from RAFT polymers, or to at least to develop a useful alternative process to those currently known.

SUMMARY OF THE INVENTION

The present invention therefore provides a process for removing thiocarbonylthio groups from polymer prepared by RAFT polymerisation, the process comprising:
introducing into a flow reactor a solution comprising the RAFT polymer in solvent; and promoting a reaction within the flow reactor that removes the thiocarbonylthio groups so as to form a solution that flows out of the reactor comprising the RAFT polymer absent the thiocarbonylthio groups.

According to the present invention, solution comprising RAFT polymer can be continuously introduced into a flow reactor and undergo reaction therein to remove the thiocarbonylthio groups such that a polymer solution comprising the RAFT polymer absent the thiocarbonylthio groups can continuously flow out of the reactor. The continuous nature of the process advantageously enables RAFT polymer absent thiocarbonylthio groups to be produced in commercial quantities. Furthermore, use of the flow reactor has been shown to produce excellent reaction control that enables reproducible production of high purity RAFT polymer absent thiocarbonylthio groups.

By "removing" the thiocarbonylthio groups from the RAFT polymer is meant that the process according to the invention converts RAFT polymer that comprises covalently bound thiocarbonylthio groups into RAFT polymer without covalently bound thiocarbonylthio groups. The process may therefore be described as a process for converting RAFT polymer comprising covalently bound thiocarbonylthio groups into RAFT polymer without covalently bound thiocarbonylthio groups.

The reaction within the flow reactor that removes the thiocarbonylthio groups may eliminate all or only part of the thiocarbonylthio group from the RAFT polymer. Where only part of the thiocarbonylthio group is removed, the thiocarbonylthio group may, for example, be converted into a thiol group. In either case, it will be appreciated that the resulting RAFT polymer will no longer contain the thiocarbonylthio groups per se (i.e. the thiocarbonylthio groups will have been removed).

Removing thiocarbonylthio groups from the RAFT polymer might therefore also be described as an act of modifying or transforming thiocarbonylthio groups.

In one embodiment, the reaction within the flow reactor that removes the thiocarbonylthio groups is promoted by increasing the temperature of the solution comprising the RAFT polymer.

In another embodiment, the reaction within the flow reactor that removes the thiocarbonylthio groups is promoted by introducing a reagent into the solution comprising the RAFT polymer.

In a further embodiment, the reaction within the flow reactor that removes the thiocarbonylthio groups is promoted by bringing the solution comprising the RAFT polymer into contact with a reagent supported on a substrate.

In another embodiment, the reaction within the flow reactor that removes the thiocarbonylthio groups is promoted by irradiating the solution comprising the RAFT polymer.

To assist with describing the invention it may be convenient to refer to the RAFT polymer absent thiocarbonylthio groups produced according to the process as being "modified RAFT polymer".

In one embodiment, the flow reactor is a continuous stirred tank reactor (CSTR).

In another embodiment, the flow reactor is a tubular flow reactor.

In yet another embodiment, the flow reactor is a microfluidic flow reactor.

In a further embodiment, the flow reactor is a capillary tubular flow reactor (also referred to as a microcapillary flow reactor).

The flow reactors may also be referred to herein as continuous flow reactors.

Despite the "micro-scale" of certain flow reactors, they can readily be operated with multiple flow lines making the scale up to large production quantities relatively straight forward. In particular, it can be more effective and efficient to "number-up" (i.e. scale up through repetition or replication) micro-flow lines to produce a given quantity of modified polymer compared with developing a single macro-flow line to produce the same amount of polymer. For example, a microfluidic flow reactor for producing 0.2 g/unit time of modified RAFT polymer can be readily be "numbered up" to produce, 2 g, 20 g, 200 g or 2 kg/unit time etc of modified RAFT polymer.

In one embodiment, the flow reactor is a tubular flow reactor constructed of metal, for example stainless steel.

Polymer prepared by RAFT polymerisation may be conveniently referred to as a "RAFT polymer". Provided RAFT polymer used in accordance with the invention comprises thiocarbonylthio groups (i.e. it has not been previously modified to remove the groups), the RAFT polymer may be derived by any suitable process.

In one embodiment, the polymer that is prepared by RAFT polymerisation and used in accordance with the invention is formed by introducing into a flow reactor a reaction solution comprising one or more ethylenically unsaturated monomers, RAFT agent, solvent and free radical initiator; and promoting RAFT polymerisation of the one or more ethylenically unsaturated monomers so as to form within the flow reactor a solution comprising the RAFT polymer in solvent.

In a further embodiment, the so formed solution comprising the RAFT polymer in solvent is introduced to the flow reactor according to the present invention. By this approach, a flow reactor may be used to prepare RAFT polymer in solvent, the likes of which then functions as feedstock RAFT polymer solution for performing the present invention. In that case, the flow reactor used to prepare the RAFT polymer can advantageously be directly coupled to the flow reactor used for performing the present invention so as to provide a single overall process for continuously preparing RAFT polymer and removing thiocarbonylthio groups therefrom.

Further aspects of the invention are described in more detail below.

BRIEF DESCRIPTION OF THE DRAWINGS

The invention will also be described herein with reference to the following non-limiting drawings in which.

Figure 1:
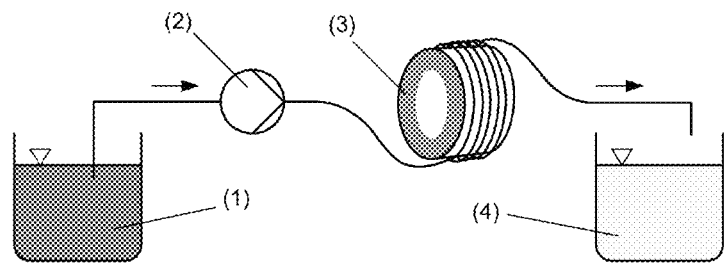
FIG. 1 shows a schematic illustration of the process according to the invention.

Some Figures contain colour representations or entities. Coloured versions of the Figures are available upon request.

DETAILED DESCRIPTION OF THE INVENTION

The present invention makes use of a flow reactor. By a "flow reactor" is meant that a reactor that has an appropriate geometry to enable (1) the solution comprising the RAFT polymer in solvent to be continuously introduced into the flow reactor, (2) the RAFT polymer to undergo reaction within the flow reactor to remove the thiocarbonylthio groups, and (3) the resulting solution comprising the RAFT polymer absent the thiocarbonylthio groups to correspondingly flow continuously out from the reactor. Such reactors are sometimes referred to in the art as a "continuous flow reactors".

There is no particular limitation regarding the type of flow reactor that can be used in accordance with the invention.

In one embodiment, the flow reactor may be in the form of a continuous stirred tank reactor (CSTR, sometimes referred to as a continuous flow stirred tank reactor). In such an embodiment, reaction solution can be continuously introduced into a tank (or vessel) in which the reaction solution is stirred. Removal of the thiocarbonylthio groups may then be promoted within the tank, and the tank is configured such that the solution comprising the RAFT polymer absent the thiocarbonylthio groups can flow out from the tank.

The flow reactor may also be of a type that comprises one or more so called "flow lines". By a "flow line" is meant a channel, capillary or tube through which the RAFT polymer solution may flow.

Provided that the RAFT polymer (before or after it is modified) solution adequately can flow, there is no particular limitation concerning the dimensions of a flow line of the reactor.

For example, when regent on solid supports are used to facilitate removal of the thiocarbonylthio groups, such as reagent supported on a polymer resin, the flow reactor may be in the form of a packed bed reactor (fixed bed or elevated bed) or of a slurry reactor. In such an embodiment, reaction solution can be continuously introduced into the column or vessel in which the solid reagent is present. Removal of the thiocarbonylthio groups may then be promoted within the reactor, and while the solid reagent and possibly by-products bound to it will be retained within reactor, solution comprising the RAFT polymer absent the thiocarbonylthio groups can flow out of the reactor.

So called "microfludic" flow reactors are flow reactors in which the flow lines that form the reactor typically have an internal width or diameter of less than about 1000 µm and more than about 10 µm.

In one embodiment, the flow reactor is in the form of a microfluidic flow reactor.

In one embodiment, the flow reactor is in the form of a continuous flow chip reactor. In such an embodiment, one or more channels may be carved (e.g. etched) into the surface of a suitable substrate (e.g. glass, metal, or polymer) and the channel covered with a suitable substrate (e.g. glass, metal, or polymer) so at to form the flow lines of the reactor. RAFT polymer solution can be continuously introduced into the flow line(s). Removal of the thiocarbonylthio groups may then be promoted within the flow lines that make up the reactor, and the chip is configured such that solution comprising the RAFT polymer absent the thiocarbonylthio groups can flow out from the reactor.

In another embodiment, the flow reactor is in the form of a tubular flow reactor. In such an embodiment, one or more tubes of a suitable substrate (e.g. glass, metal, or polymer) form the flow lines of the reactor. RAFT polymer solution can be continuously introduced into the flow line(s). Removal of the thiocarbonylthio groups may then be promoted within the flow lines that make up the reactor, and the one or more tubes are configured such that solution comprising the RAFT polymer absent the thiocarbonylthio groups can flow out from the reactor.

The tubular flow reactor may be a capillary tubular flow reactor. The internal diameter of a flow tube that forms such flow reactors may range between 10 and 1,000 µm. A particular advantage offered by such flow reactors is their high surface area to volume ratio which can range from about 10,000 to about 50,000 $m^2/m^3$. This contrasts significantly with the surface area to volume ratio provided by conventional batch reactors which is usually in the order of about 100 $m^2/m^3$ and seldom exceeds 1,000 $m^2/m^3$. As a result of their high surface area to volume ratio, such flow reactors offer excellent heat transfer across the flow line wall, allowing for efficient and fast cooling of exothermic reactions and quasi-isothermal process control of slower reactions which are mildly exo- or endothermic. The net effect of this is an ability to achieve excellent process control over removal of the thiocarbonylthio groups.

In one embodiment, the tubular flow reactor comprises one or more flow lines having and internal diameter of no more than about 2 mm, for example of no more than about 1.5 mm, or no more than about 1 mm. In a further embodiment the tubular flow reactor comprises one or more flow lines having and internal diameter ranging from about 0.5 mm to about 1.5 mm, or about 0.8 mm to about 1.2 mm. In yet a further embodiment the tubular flow reactor comprises one or more flow lines having and internal diameter of about 1 mm.

In a further embodiment, the flow reactor comprises a packed bed column for solid-liquid phase reactions, the packed bed column having an internal diameter of no more than about 25 mm, for example of no more than about 8 mm, or no more than about 4 mm.

Conventional flow reactors used within the wider chemical manufacturing industry can advantageously be used in accordance with the invention.

Further details relating to flow reactors suitable for use in accordance with the invention may be found in Hessel V., Hardt S., Löwe H., 2004, *Chemical Micro Process Engineering* (1), *Fundamentals, Modelling and Reactions*, Wiley-VCH, Weinheim, Germany, and T. Wirth, 2008, *Microreactors in Organic Synthesis and Catalysis*, Wiley-VCH, Weinheim.

The flow reactor may be provided with one or more flow lines. In the case of microfluidic type flow reactors, multiple flow lines will generally be used in order to provide for the desired throughput. For example, in the case of tubular type flow reactors multiple flow lines may be bundled or coiled, and in the case of chip type flow reactors multiple flow lines may be carved in to a substrate and multiple channelled substrates may be stacked on top of one another. The ease with which one can scale up the process, merely by introducing additional coils, additional flow lines, multiple parallel stacked channels and the like, makes adoption of flow chemistry to remove thiocarbonylthio groups from RAFT polymers commercially very attractive.

Provided that removal of the thiocarbonylthio groups from RAFT polymers can occur within the flow reactor, there is no particular limitation regarding the material from which a flow line of the flow reactor is constructed. Generally, the flow reactor will comprise a flow line that is made from polymer, metal, glass (e.g. fused silica) or combinations thereof.

Examples of polymer from which a flow line/flow reactor can be constructed include perfluoroalkoxy polymer (PFA), fluorinated ethylene propylene (FEP), TEFLON, polyether ether ketone (PEEK), and polyethylene (PE).

Examples of suitable metals from which a flow line/flow reactor may be constructed include stainless steel, and other corrosion resistant metal alloys such as those sold under the trade name Hastelloy®.

Those skilled in the art will appreciate that removal of the thiocarbonylthio groups from RAFT polymers can be adversely effected by the presence of oxygen. The process of invention will therefore generally be conducted so as to minimise exposure of the RAFT polymer solution to oxygen. Accordingly, it may be desirable to select materials from which a flow line/flow reactor is to be constructed such that it has adequate oxygen barrier properties.

Exclusion of oxygen can also be an important factor where the process of the invention further comprises a step of first forming the RAFT polymer in solvent within a flow reactor and then using the resulting polymer solution as a source of RAFT polymer from which the thiocarbonylthio groups are to be removed.

Thus, certain reactor types can be less favourable for performing the present invention, either due to the material of fabrication or their geometry. For example, it has been found that thin-walled PFA tubing (1.6 mm OD/1.0 mm ID) inhibits the formation of RAFT polymers as a result of its high oxygen permeability, whereas stainless steel tubing with the same internal diameter (1.0 mm) and similar wall thickness allows for an effective polymerisation to take place (by acting as a barrier to oxygen).

Oxygen exposure can of course also be minimised by conducting the removal of the thiocarbonylthio groups, and optionally polymerisation to form the RAFT polymer, under an inert atmosphere such as argon or nitrogen. Using an inert atmosphere in this way can enable the use of flow lines that have relatively poor oxygen barrier properties.

It has also been found that minimising the exposure of the RAFT polymer solution to oxygen can effectively and efficiently be achieved by performing the present invention using microfluidic reactors. In particular, microfluidic reactors can be readily set up so as to minimise the reaction solutions exposure to oxygen.

Without regard to the oxygen permeability of a flow line per se, the RAFT polymer solution used in accordance with the invention can also be readily depleted of oxygen using techniques know in the art. For example, the solution may be sparged with an inert gas such as nitrogen or argon. Alternatively, the solution may be passed through a degasser unit. Conventional degassers such as those used in high pressure liquid chromatography (HPLC) applications may be conveniently employed in the present invention.

A convenient source of a flow line for use in a capillary tubular flow reactor is so called "microfluidic tubing". Such microfluidic tubing may be made from polymer or metal, such as those outlined above in respect of the flow lines, glass (e.g. fused silica), or combinations thereof.

According to the invention, a solution comprising RAFT polymer in solvent is introduced into the flow reactor. Provided the thiocarbonylthio groups can be removed from the RAFT polymer within the flow reactor (and of course the RAFT polymer can be dissolved to form the RAFT polymer solution), there is no particular limitation concerning the type of solvent that can be used.

The solvent used in accordance with the invention functions primarily as an inert liquid carrier. The solvent may therefore also be described as a non-reactive solvent.

By the solvent being "non-reactive" is meant that it does not undergo chemical reaction during the thiocarbonylthio group removal process, or in other words it does not play an active role or participate in the thiocarbonylthio group removal process per se. In addition to the solvent being selected for its property of being non-reactive in the context of the thiocarbonylthio group removal process, it will also be selected for its ability to act as a solvent and dissolve as required any agents to effect the thiocarbonylthio group removal process, and if the process also involves forming the RAFT polymer, dissolve as required any agents to effect the polymerisation process.

The solvent will of course also be compatible with (i.e. will not adversely effect) the material from which the flow reactor is constructed and makes contact with the solvent. Those skilled in the art will be able to readily select a solvent(s) for both its non-reactivity and solvation properties.

There is a vast array of solvents that may be used in accordance with the invention. Examples of such solvents include, but are not limited to, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diglyme (diethylene glycol dimethyl ether), 1,2-dimethoxy-ethane (glyme, DME), dimethylether, dimethyl-formamide (DMF), dimethyl sulfoxide (DMSO), dioxane, ethanol, ethyl acetate, ethylene glycol, glycerin, heptane, hexamethylphosphoramide (HMPA), hexamethylphosphorous triamide (HMPT), hexane, methanol, methyl t-butyl ether (MTBE), methylene chloride, N-methyl-2-pyrrolidinone (NMP), nitromethane, pentane, petroleum ether, 1-propanol, 2-propanol, pyridine, tetrahydrofuran (THF), toluene, triethyl amine, water, heavy water, o-xylene, m-xylene, p-xylene, and combinations thereof.

RAFT polymer from which the thiocarbonylthio groups are to be removed may be formed by any known RAFT polymerisation process. For example, a pre-formed (by any process) RAFT polymer may simply be dissolved in a suitable solvent and introduced into the flow reactor.

Alternatively, and as will be discussed in more detail below, RAFT polymer may be prepared as an initial step in the process of the invention, with the so formed RAFT polymer subsequently being subjected to the thiocarbonylthio group removal process according to the invention. In that case, RAFT polymer may be prepared by a process comprising introducing into a flow reactor a reaction solution comprising one or more ethylenically unsaturated monomers, RAFT agent, solvent and free radical initiator;

and promoting RAFT polymerisation of the one or more ethylenically unsaturated monomers within the reactor so as to form RAFT polymer solution that flows out of the reactor.

The flow reactor used to prepare the RAFT polymer may be the same as that herein described and advantageously coupled to the flow reactor used in the present invention such that the resulting RAFT polymer solution is introduced to the flow reactor within which the thiocarbonylthio groups are to be removed. Combining such processes in this way advantageously provides for a single overall process for continuously preparing RAFT polymer and removing thiocarbonylthio groups therefrom.

A variety of techniques are known for removing thiocarbonylthio groups from RAFT polymers. Such techniques can advantageously be used in accordance with the present invention. Suitable techniques are described, for example, in Chong et al, Macromolecules 2007, 40, 4446-4455; Chong et al, Aust. J. Chem. 2006, 59, 755-762; Postma et al, Macromolecules 2005, 38, 5371-5374; Moad et al, *Polymer International* 60, no. 1, 2011, 9-25; and Wilcock et al, Polym. Chem., 2010, 1, 149-157.

A summary of such techniques is shown below in Scheme 2.

Scheme 2: Summary of techniques for removing thiocarbonylthio groups fro RAFT polymer.

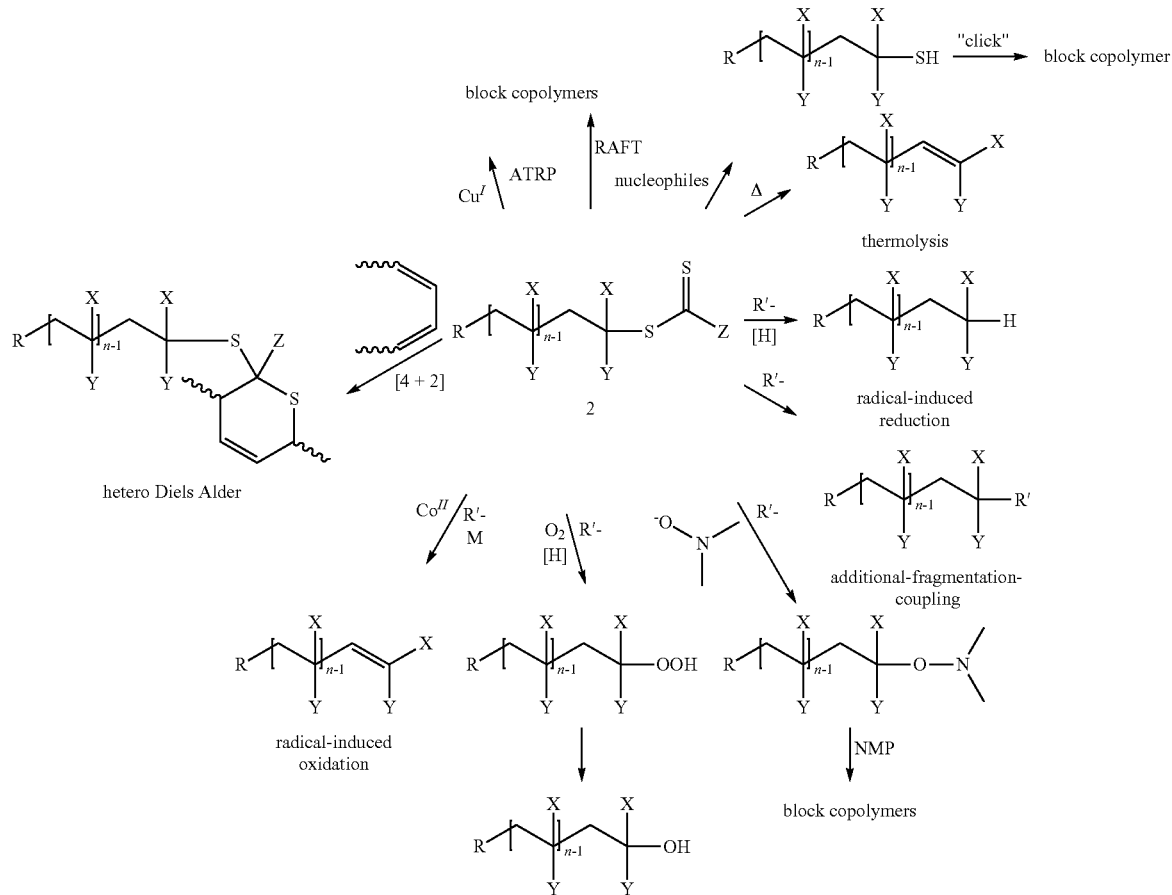

An important feature of the present invention is that thiocarbonylthio groups are removed from the RAFT polymer. As previously indicated, the process of removing the thiocarbonylthio groups may eliminate all or only part of the thiocarbonylthio groups from the RAFT polymer. In either case, it will be appreciated that the resulting RAFT polymer will no longer contain the thiocarbonylthio groups per se and as such the thiocarbonylthio groups can be described as having been "removed".

There is no particular limitation concerning the location of the thiocarbonylthio groups on the RAFT polymer. In one embodiment, the thiocarbonylthio group(s) is a terminal substituent.

In one embodiment, the reaction within the flow reactor that removes the thiocarbonylthio groups is promoted by increasing the temperature of the solution comprising the RAFT polymer. Such a technique is commonly referred to as thermolysis of the thiocarbonylthio groups. This technique can provide for elimination or cleavage of the thiocarbonylthio group so as to provide for a RAFT polymer that is entirely free of sulfur atoms derived from the thiocarbonylthio group. This effect of the process is therefore sometimes referred to as desulfurisation of the RAFT polymer.

In practice, thermolysis of the thiocarbonylthio groups is promoted simply by suitably increasing the temperature of the solution comprising the RAFT polymer.

To promote thermolysis of the thiocarbonylthio groups the temperature of the solution comprising the RAFT polymer will generally be heated to a temperature ranging from about 100° C. to about 300° C., for example from about 150° C. to about 280° C., or form about 200° C. to about 260° C.

The temperature of the solution comprising the RAFT polymer may be increased by any suitable means known in the art.

Those skilled in the art will appreciate that using thermolysis to promote removal of the thiocarbonylthio groups of RAFT polymer will require an assessment of the thermal stability of the RAFT polymer per se and also any other functional groups that are covalently attached to it. For example, thermolysis may not be an appropriate technique to use for removal of the thiocarbonylthio groups if the RAFT polymer itself and/or any other important functional groups covalently bound thereto are thermally unstable at the temperature required to promote thermolysis of the thiocarbonylthio groups. Those skilled in the art will be able to readily assess the suitability of using thermolysis to remove the thiocarbonylthio groups on a case by case basis, including determining the appropriate temperature at which to induce thermolysis.

Unlike conventional approaches to applying thermolysis for removing thiocarbonylthio groups from RAFT polymers, the process in accordance with the present invention not only provides a means for continuously performing the thermolysis, but the thermolysis can be conducted in an effective and efficient manner. In particular, the flow reactor used in accordance with the invention can offer excellent heat transfer across the flow line wall, allowing for excellent process control over the thermolysis. This is in contrast with batch style thermolysis processes where significant temperature gradients can develop within the solution comprising the RAFT polymer leading to "hot" and "cold" spots within the solution, which in turn can reduce the quality of the resulting RAFT polymer composition, especially for systems were the temperature for removal of the thiocarbonylthio group is very close to the degradation temperature of the polymer.

In another embodiment, the reaction within the flow reactor that removes the thiocarbonylthio groups is promoted by introducing a reagent into the solution comprising the RAFT polymer. A variety of reagents for promoting thiocarbonylthio group removal are known.

In one embodiment, the introduced reagent promotes radical induced thiocarbonylthio group removal.

Radical induced thiocarbonylthio group removal generally requires introduction of a radical generating species such as a free radical initiator and also introduction of a hydrogen atom donor source.

Examples of free radical initiators are outlined in more detail below. Common free radical initiators used to promote thiocarbonylthio group removal of RAFT polymers include, but are not limited to, 2,2'-azo(bis)isobutyronitrile (AIBN), 1,1'-azobis(cyclohexanecarbonitrile) (ACHN), and azobis [2-methyl-N-(2-hydroxyethyl)propionamide] (AMHP), 4'-azobis(4-cyanopentanoic acid) (ACPA), 2,2'-azobis(5-hydroxy-2 methylpentanenitrile) (AHPN), dibenzoyl peroxide (BPO), didodecyl peroxide (LPO), tert-butyl 2-ethylhexaneperoxoate (T21S) and combinations thereof.

Examples of hydrogen atom donor compounds that may be used in conjunction with a free radical initiator to promote thiocarbonylthio group removal of RAFT polymers include, but are not limited to, hypophosphite salts such as N-ethylpiperidine hypophosphate (EPHP), stannanes such as tributylstannane, alcohols such as 2-propanol, silanes such as triethylsilane, triphenylsilane, tris(trimethylsilyl)silane, and combinations thereof.

As with the thermolysis approach outlined above, radical induced thiocarbonylthio group removal can provide for desulfurisation of the RAFT polymer.

Other reagents that may be introduced to promote thiocarbonylthio group removal include nucleophilic reagents such as ammonia, amines, hydroxides and thiols. Reaction of such nucleophilic reagents with a thiocarbonylthio group converts the thiocarbonylthio group into a thiol group.

A common nucleophilic reagent employed to promote thiocarbonylthio group removal includes amine compounds such as primary or secondary amine nucleophilic compounds. Reaction of such an amine reagent with a thiocarbonylthio group converts the thiocarbonylthio group into a thiol group.

Accordingly, in one embodiment, the reagent removes the thiocarbonylthio group by converting it into a thiol group.

The use of an amine reagent to remove thiocarbonylthio groups from RAFT polymer is often referred to as aminolysis of the RAFT polymer.

Examples of suitable amine reagents include, but are not limited to ethylamine, propylamine, butylamine hexylamine, octylamine, benzylamine, ethylenediamine, hydrazine, piperidine, aminoethanol and combinations thereof.

When the thiocarbonylthio groups are removed by aminolysis, it may be desirable to exclude oxygen from the RAFT polymer solution being subjected to aminolysis as the resulting thiol groups formed can be readily oxidised in the presence of oxygen to form disulfide linkages. As an alternative to, or in addition to, excluding oxygen from the RAFT polymer solution to minimise such disulfide formation, a reducing agent can be introduced into the RAFT polymer solution to assist with preventing disulfide formation.

Examples of suitable reducing agents include, but are not limited to, zinc/acidic acid, tributyl phosphine, tris(2-carboxyethyl) phosphine (TCEP), borohydrides such as $NaBH_4$ used in combination with tributyl phosphine, and $LiBH(C_2H_5)_3$, dimethylphenylphosphine (DMPP) sodium dithionite ($Na2S2O4$), sodium bisulfite ($NaHSO3$), ethylenediaminetetra (acetic acid) (EDTA), and combinations thereof.

Other reagents that may be introduced to promote thiocarbonylthio group removal include diene reagents that can undergo a hetero Diels Alder reaction with the thiocarbonylthio group. In that case, the thiocarbonylthio group functions as a dienophile and can take part in a hetero Diels Alder reaction with the diene reagent. This technique can be used to advantageously promote coupling of RAFT polymer chains.

Examples of suitable diene reagents include, but are not limited to, (2E,4E)-hexa-2,4-diene, cyclopenta-1,3-diene, and combinations thereof.

Further reagents that may be introduced to promote thiocarbonylthio group removal include oxidising agents such as ozone, air, peroxides such as hydrogen peroxide and tbutyl peroxide, hydroperoxides, and peracids.

To promote removal of the thiocarbonylthio groups, the reagents may be introduced into the solution comprising the RAFT polymer by any suitable means. For example, the reagent may be dissolved in a suitable solvent and introduced by way of a valve, mixer T-piece or suitable injection means into the flow reactor comprising the solution of RAFT polymer.

It may be that the reagent will react with the thiocarbonylthio group spontaneously upon coming into contact with the RAFT polymer. Alternatively, it may be necessary to promote the reaction by, for example, increasing the temperature of the RAFT polymer solution, or irradiating the RAFT polymer solution.

Provided that the reagent does not react with the thiocarbonylthio group spontaneously upon coming into contact with the RAFT polymer, the reagent can also simply be combined with the solution comprising the RAFT polymer before this combined solution is introduced to the flow reactor.

Rather than combining a solution of the reagent with the solution of RAFT polymer, the solution of RAFT polymer may instead be passed over a substrate having the reagent supported thereon. For example, the solution comprising the RAFT polymer may be past over a polymer substrate supporting suitable amine compounds.

Accordingly, in one embodiment, the reagent is provided in the form of a solution and is introduced into the solution comprising the RAFT polymer.

In a further embodiment, the reagent is provided on a solid support and the solution comprising the RAFT polymer is passed over the solid support.

Examples of suitable solid supports include, but are not limited to, those made from silica, polymer, metal, and metal oxides.

Examples of reagents provided on a solid support include, but are not limited to, Quadrapure BZA, Diethylenetriamine resin (DETA), Tris(2-aminoethyl)amine polymer-bound, and p-Toluenesulfonyl hydrazide polymer-bound.

In a further embodiment, the reaction within the flow reactor that removes the thiocarbonylthio groups is promoted by irradiating the solution comprising the RAFT polymer. In that case, the solution comprising the RAFT polymer will generally be irradiated with ultraviolet radiation. Those skilled in the art will be able to readily determine the suitable wavelength of UV radiation for promoting removal of the thiocarbonylthio groups.

To irradiate the solution comprising the RAFT polymer, the flow reactor within which the solution is contained will of course need to be sufficiently transparent to the radiation used. For example, where the solution comprising the RAFT polymer is irradiate with ultraviolet radiation, the flow reactor must be suitably transparent to the wavelength of UV radiation applied. In that case, the flow reactor can comprise suitably transparent polymer tubbing, for example fluoropolymer tubing such as that made from perfluoroalkoxy (PFA), wrapped or otherwise positioned around a suitable light source e.g. a tubular gas-discharge lamp. The flow can be delivered by a pumping system and the reaction will be induced by the UV radiation emitted from the lamp. After reaction, the thiocarbonylthio group free polymer is collected at the outlet of the reactor. Due to the small dimensions of the micron- or millimeter-sized tubing it can be ensured that the radiation provided by the light source is utilised efficiently and that the entire bulk of solution pumped through the tubing is exposed to similar amounts of radiation, thus achieving homogeneous reaction conditions. Due to the limited penetration depth of UV radiation in most liquids, a small tubing diameter can be important. In contrast, large, conventional tubing (centimeter to meter-sized tubing) or stirred tank reactors present an inhomogeneous irradiation profile, and can therefore lead to very inefficient reaction conditions.

The process in accordance with the invention can advantageously promote excellent thiocarbonylthio group removal efficiency. For example, the process can promote removal of up to 80%, or 90%, or 95%, or even 100% of thiocarbonylthio groups from RAFT polymer.

Upon undergoing reaction within the flow reactor to remove the thiocarbonylthio groups, the resulting solution will comprise (1) RAFT polymer absent the thiocarbonylthio groups and (2) other reaction byproducts. The RAFT polymer absent the thiocarbonylthio groups can be readily isolated from the solution using techniques well known to those skilled in the art.

To assist with describing the process of the invention in more detail, reference will now be made to FIG. 1-5.

FIG. 1 illustrates a flow diagram of a continuous process for the removal of thiocarbonylthio groups from RAFT polymer by thermolysis. The feedstock tank (1) comprises a solution of RAFT polymer in solvent. This solution is then pumped (2) into the continuous flow reactor (3) to which heat is applied to remove the thiocarbonylthio groups from the RAFT polymer by thermolysis. The polymer solution comprising RAFT polymer absent thiocarbonylthio groups is then collected in the product tank (4).

Figure 2:
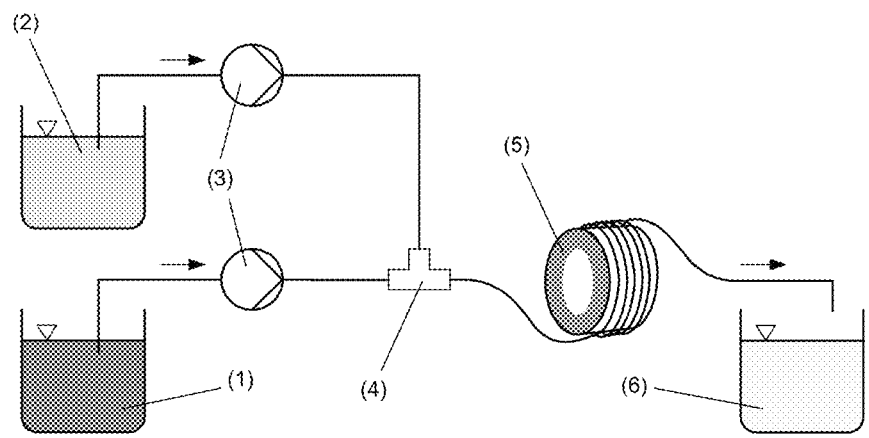
FIG. 2 shows a schematic illustration of the process according to the invention.

FIG. 2 illustrates a flow diagram of a continuous process for the removal of thiocarbonylthio groups from RAFT polymer by radical induced reduction using free radical initiator and hypophosphite. The feedstock tank (1) comprises a solution of RAFT polymer in solvent. The feedstock tank (2), comprises a solution of free radical initiator and hypophosphite. The solutions from Feedstock tanks (1) and (2) are then pumped (3) to the T-piece/mixer (4) where their flows are combined and passed through to continuous flow reactor (5). Heat is then applied to the reactor (5) to promote the radical induced reduction and removal of the thiocarbonylthio groups from the RAFT polymer. The heat applied to reactor (5) is sufficient to promote the radical induced reduction but will be less than the heat required to promote removal of the thiocarbonylthio groups from the RAFT polymer by thermolysis. The polymer solution comprising RAFT polymer absent thiocarbonylthio groups is then collected in the product tank (6).

Figure 3:
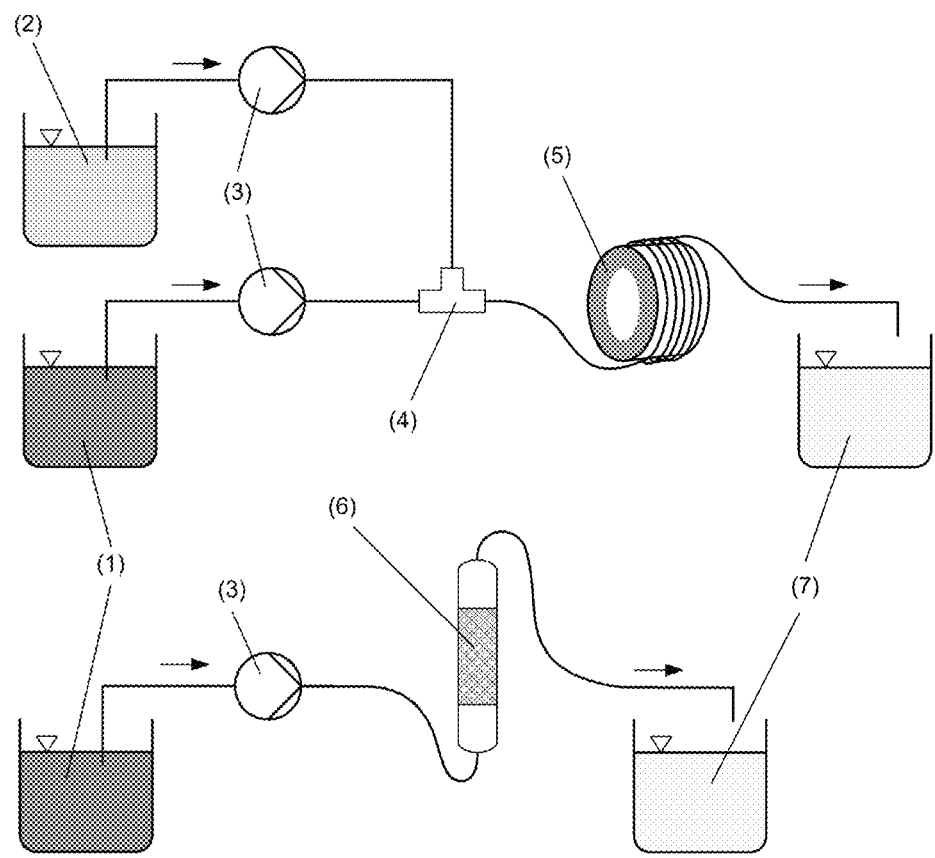
FIG. 3 shows a schematic illustration of the process according to the invention.

FIG. 3 illustrates a flow diagram of two separate continuous processes for the removal of thiocarbonylthio groups from RAFT polymer by aminolysis. The feedstock tank (1) comprises a solution of RAFT polymer in solvent. The feedstock tank (2) comprises an amine solution. In the case of the process using both feedstock tanks (1) and (2), solutions from these tanks (1) and (2) are pumped (3) to the T-piece/mixer (4) where their flows are combined and passed through to continuous flow reactor (5). In the case of the process using only feedstock tank (1), the solution from this tank (1) is pumped (3) to a flow reactor comprising a solid supported reagent (6) such as a packed bed column containing polymer supported amine reagent. If required, heat may then be applied to the reactor (5) and (6) to promote the aminolysis and removal of the thiocarbonylthio groups from the RAFT polymer. If required, the heat applied to reactor (5) and (6) is sufficient to promote the aminolysis but will be less than the heat required to promote removal of the thiocarbonylthio groups from the RAFT polymer by thermolysis. The polymer solution comprising RAFT polymer absent thiocarbonylthio groups is then collected in the product tank (7).

Figure 4:
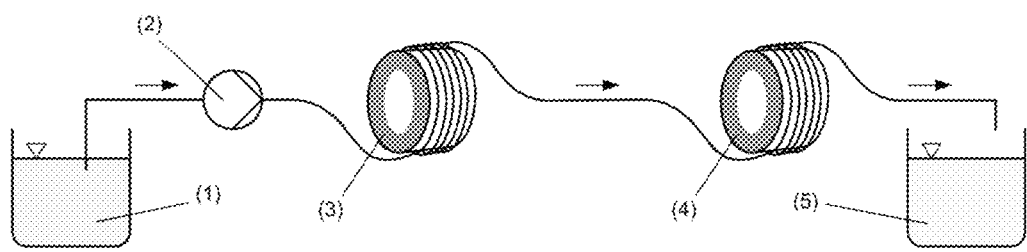
FIG. 4 shows a schematic illustration of the process according to the invention.

FIG. 4 illustrates a flow diagram of a two-step continuous process (top and bottom) for the formation of RAFT polymer and the subsequent removal of thiocarbonylthio groups from the RAFT polymer by thermolysis. The feedstock tank (1) comprises a reaction solution comprising one or more ethylenically unsaturated monomers, RAFT agent, non-reactive solvent and free radical initiator. This solution is then pumped (2) into the continuous flow reactor (3) to which heat is applied to promote polymerisation and formation of RAFT polymer. The heat applied to the reactor will of course be appropriate to promote polymerisation and not thermolysis of thiocarbonylthio groups, the effect of which would be to in effect prevent the polymerisation. Further detail about the polymerisation process step is discussed below with reference to FIG. 6. The resulting RAFT polymer solution is then transferred to flow reactor (4) to remove the thiocarbonylthio groups from the RAFT polymer by thermolysis. The polymer solution comprising RAFT polymer absent thiocarbonylthio groups is then collected in the product tank (5).

Figure 5:
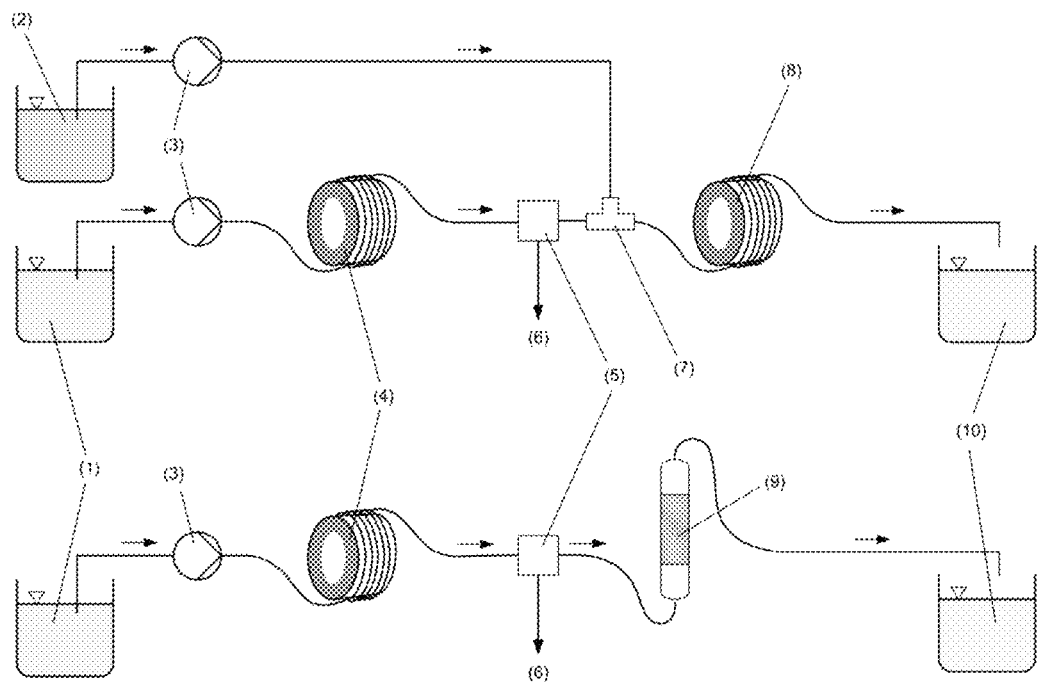
FIG. 5 shows a schematic illustration of the process according to the invention.

FIG. 5 illustrates a flow diagram of two separate two-step continuous processes (top and bottom) for the formation of RAFT polymer and the subsequent removal of thiocarbonylthio groups from the RAFT polymer by aminolysis. The feedstock tank (1) comprises a reaction solution comprising one or more ethylenically unsaturated monomers, RAFT agent, non-reactive solvent and free radical initiator. The solution from feedstock tank (1) is then pumped (3) into the continuous flow reactor (4) to which heat is applied to promote polymerisation and formation of RAFT polymer. The heat applied to the reactor will of course be appropriate to promote polymerisation and not thermolysis of thiocarbonylthio groups, the effect of which would be to in effect prevent the polymerisation. Further detail about the polymerisation process step is discussed below with reference to FIG. 6. The resulting RAFT polymer solution is then optionally treated (5) to remove any residual unreacted monomer (6). Unreacted monomer in the RAFT polymer solution can react with the aminolysis reaction product to form thioether functionality. In the absence of unreacted monomer in the RAFT polymer solution, the aminolysis can provide for thiol functionality. In the case of the process using both feedstock tanks (1) and (2), the solution from tank (2) is pumped (3) to the T-piece/mixer (7) where it is combined with the resulting RAFT polymer solution, optionally treated (5) or not, and passed through to continuous flow reactor (8). In the case of the process using only feedstock tank (1), the resulting RAFT polymer solution, optionally treated (5) or not, is passed into the packed bed column containing polymer supported amine that functions as the flow reactor (9). If required, heat is then applied to the reactor (8) and (9) to promote the aminolysis and removal of the thiocarbonylthio groups from the RAFT polymer. If required, the heat applied to reactor (8) and (9) is sufficient to promote the aminolysis but will be less than the heat required to promote removal of the thiocarbonylthio groups from the RAFT polymer by thermolysis. The polymer solution comprising RAFT polymer absent thiocarbonylthio groups is then collected in the product tank (10).

RAFT polymer used in accordance with the invention may be prepared by RAFT solution polymerisation. By "solution polymerisation" is meant a polymerisation technique where monomer that is dissolved in solvent undergoes polymerisation to form polymer that is itself also dissolved in the solvent (i.e. forms a polymer solution). The so formed RAFT polymer solution can then be used in accordance with the invention.

A discussion on using a flow reactor to prepare a solution comprising RAFT polymer that may be used in accordance the invention is provided below.

Those skilled in the art will appreciate that solution polymerisation is a different polymerisation technique to emulsion or suspension polymerisation. The latter two polymerisation techniques typically utilise a continuous aqueous phase in which is dispersed a discontinuous organic phase comprising monomer. Upon promoting polymerisation of monomer within the dispersed phase, the techniques afford an aqueous dispersion of polymer particles or latex. Unlike solution polymerisation, polymer formed by emulsion and suspension polymerisation is not soluble in the liquid reaction medium.

Despite being useful under certain circumstances, emulsion and suspension polymerisation techniques require the use of surfactants and other polymerisation adjuvants which remain in the resulting polymer and are difficult to remove. Furthermore, if the resulting polymer is to be isolated from the aqueous dispersion, separation of water from the polymer is an energy intensive process.

In contrast, solution polymerisation does not require the use of surfactants or polymerisation adjuvants, and if required the non-reactive solvent used may be selected to facilitate its ease of separation from the resulting polymer.

Having said this, production of commercial quantities of polymer using solution polymerisation techniques can be problematic. For example, solution polymerisation conducted batch-wise can present difficulties in terms of ensuring the reaction components are adequately mixed, and also in terms of controlling the temperature of the reaction solution. The batch-wise methodology is volume limited, inflexible, requires highly efficient mixing and heat transfer to achieve good conversions and high yields. By conducting a process such as polymerisation "batch-wise" is meant that the reaction solution comprising the required reagents is charged into a reaction vessel, polymerisation of the monomer is promoted so as to form the polymer solution, and the polymer solution is subsequently removed from the reaction vessel. The process can be repeated by again charging the reaction vessel with the reaction solution and so on.

To assist with describing the process of preparing RAFT polymer using a flow reactor, reference will now be made to FIG. 6.

Figure 6:
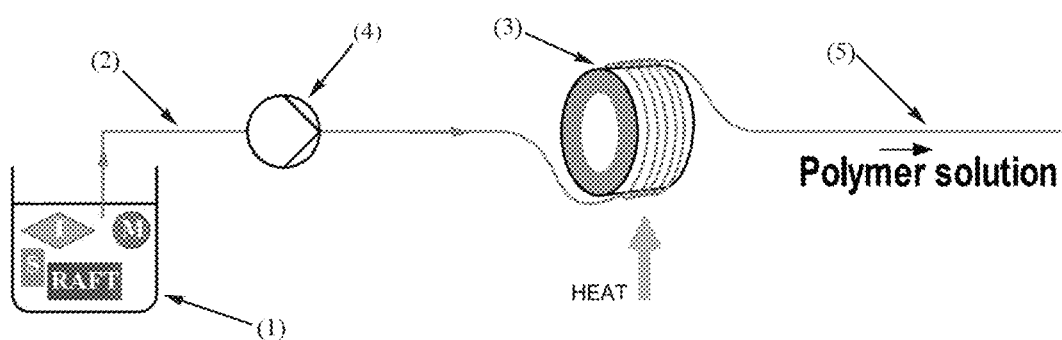
FIG. 6 shows a schematic illustration of a process for forming a RAFT polymer solution that may be used in accordance with the present invention.

FIG. 6 shows a reaction solution comprising one or more ethylenically unsaturated monomers (M), RAFT agent (RAFT), non-reactive solvent (S) and free radical initiator (I) contained within a vessel (1). One or more of these reagents (M, RAFT, S, I) could of course be provided in a separate vessel such that multiple flow lines feed into the flow reactor and thereby deliver the reaction solution thereto. For example, the reaction solution may be introduced via three individual flow lines that merge into single main flow line that leads directly to the flow reactor, with each of the three individual flow lines drawing from three separate vessels that contain (M, S), (RAFT, S) and (I, S), respectively. Further detail in relation to the reaction solution is provided below.

The reaction solution is transferred via a flow line (2) and introduced into the flow reactor (3). The flow line (2) is of a tubular type herein described and in effect forms the flow reactor (3) by being shaped into a coil configuration. The distinction between the flow line (2) and the flow reactor (3) is that the flow reactor (3) is a designated section of the flow line (2) where polymerisation of the reaction solution is to be promoted. Further detail of means for promoting the polymerisation reaction is discussed below, but in the case of FIG. 6, an example of promoting the polymerisation reaction is shown by way of application of heat to the flow reactor (3). The heat applied to the reactor will of course be appropriate to promote polymerisation and not thermolysis of thiocarbonylthio groups, the effect of which would be to in effect prevent the polymerisation.

The flow line (2) will be configured into a flow reactor (3) by winding the flow line (2) into a coil. The coiled section of the flow line (2) is then readily demarcated as the flow reactor (3).

Upon promoting polymerisation of the reaction solution within the flow reactor (3), a polymer solution (5) is formed which subsequently flows out of the flow reactor (3). The so formed RAFT polymer solution (5) can then be directly feed to the flow reactor for removal of the thiocarbonylthio groups according to the present invention.

Introducing the reaction solution into the flow reactor (3) can be facilitated by any suitable means, but this will generally be by action of a pump (4). Those skilled in the art will be able to select a suitable pump (4) for the purpose of transferring the reaction solution from the vessel (1) along the flow line (2) and introducing it to the flow reactor (3).

Figure 7:
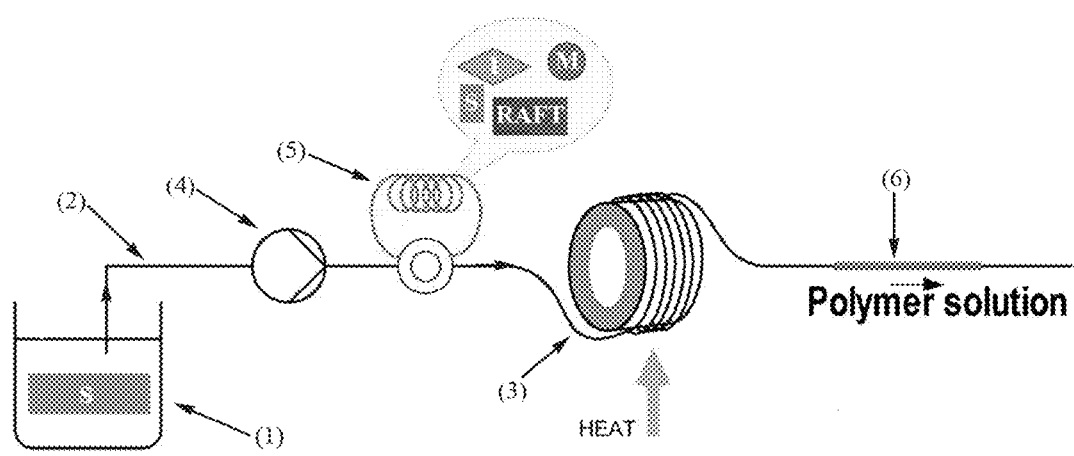
FIG. 7 shows a schematic illustration of a process for forming a RAFT polymer solution that may be used in accordance with the present invention.

It will be appreciated that the process illustrated by FIG. 6 can be operated continuously by ensuring that vessel (1) is maintained with reaction solution. Multiple flow lines can of course also be used to form the flow reactor (3) so as to increase the volume of reaction solution drawn from vessel (1) and thereby increase the volume of polymer solution produced.

Where only a relatively small amount of polymer is to be produced for the purpose of development or optimisation of reaction conditions, the invention can conveniently be performed in a so called "segmented" flow mode using individual and separated "plugs" of reactions solution in small (analytical) volumes. This mode of operation is illustrated in FIG. 7. With reference to FIG. 7, the vessel (1), flow line (2), flow reactor (3) and pump (4) are the same as described above for FIG. 5. However, in this case the vessel (1) only comprises non-reactive solvent (S). The process is conducted by first introducing only non-reactive solvent (S) into the flow reactor (3). Reaction solution comprising one or more ethylenically unsaturated monomers (M), RAFT agent (RAFT), initiator (I) and optionally non-reactive solvent (S) is provided in the reaction solution loop (5) which can be isolated from the flow line (2) that leads to the flow reactor (3). At a suitable time the reaction solution loop (5) can be switched so as to release the reaction solution stored in the loop into the flow line (2) such that a "segment" or "plug" of the reaction solution is introduced into the flow reactor (3). The plug of reaction solution then undergoes polymerisation within the flow reactor (3) so as to form a polymer solution plug (6) that flows out of the flow reactor (3). Again, the so formed RAFT polymer solution plug can then be directly feed to the flow reactor for removal of the thiocarbonylthio groups according to the present invention.

Those skilled in the art will appreciate that flow reactors of the type contemplated for use in accordance with the invention, particularly microfluidic flow reactors, are prone to high pressure build-up leading to system failure if the liquid within the flow line becomes highly viscous. For this reason, it is generally desired that solutions typically used in flow reactors, particularly microfluidic flow reactors, have a viscosity not much higher than that of water. As the viscosity of polymer solutions can be quite high, flow reactors, particularly microfluidic flow reactors, are not widely used for performing polymerisation reactions.

Pressure increases in the flow reactor can be managed through control of process variables such as concentration of monomer (or polymer) within the solvent and the rate of polymerisation, the likes of which can conveniently be controlled by the process flow rate.

Polymers prepared by RAFT polymerisation can exhibit a well defined molecular architecture. In particular, multiple RAFT polymerisation reactions can be conducted sequentially so as to provide for well defined block copolymers. The process of preparing RAFT polymer using a flow reactor can be tailored to take advantage of this feature of RAFT polymerisation. For example, a polymer solution flowing out of a first flow reactor (or first flow reactor region) can be introduced into a second flow reactor (or second flow reactor region) along with ethylenically unsaturated monomer (typically different from that polymerised in the first reactor (region)) and free radical initiator. Polymerisation can then be promoted in the second flow reactor (or second flow reactor region) so as to form a block copolymer solution that flows out of the second flow reactor (or second flow reactor region). The so formed RAFT polymer solution plug can then be directly feed to the flow reactor for removal of the thiocarbonylthio groups according to the present invention.

Those skilled in the art will appreciate that RAFT polymer prepared in the flow reactor can itself function as a macro-RAFT agent. Accordingly, the polymer solution may be used as a source of macro-RAFT agent to promote polymerisation of a "second" charge of monomer so as to conveniently form a block co-polymer. Use of a flow reactor is particularly well suited to continuously preparing such block co-polymers.

By introducing the RAFT polymer solution into (a) a flow reactor, or (b) a "region" of a flow rector in the context of forming block copolymers is meant that (a) the polymer solution may be introduced into a different flow reactor from which it was prepared in order to undergo a second polymerisation, or (b) the polymer solution is prepared in a first part of a given flow reactor and the resulting polymer solution then progresses on to a region of the same rector where reaction solution is again introduced and a second polymerisation takes place. Generally, the flow reactor or the region of a flow rector into which the polymer solution is introduced will be coupled to the flow reactor into which the reaction solution is introduced. In other words, the so called "second stage" polymerisation can simply be conducted in a down stream section or region of the flow reactor in which the "first stage" polymerisation is conducted.

In one embodiment, the process further comprises introducing the polymer solution into a flow reactor or a region of a flow rector, together with a reaction solution comprising one or more ethylenically unsaturated monomers and free radical initiator; and promoting RAFT polymerisation of the one or more ethylenically unsaturated monomers within the reactor so as to form a block copolymer solution that flows out of the reactor.

The so formed RAFT block co-polymer solution can then be directly feed to the flow reactor for removal of the thiocarbonylthio groups according to the present invention.

If necessary, RAFT polymer solution formed within the reactor may be subject to purification. Possible unwanted reactants or products that may not be desirable in the polymer end product include unreacted monomer, unreacted initiators or byproducts. Depending on the purity requirements of the RAFT polymer that is formed absent thiocarbonylthio groups, it may be desirable to separate such unwanted reactants or products from the RAFT polymer solution that is used in accordance with the invention. This purification can conveniently be achieved by subjecting the polymer solution to an inline purification technique (i.e. whereby the purification technique is integrated into the process).

The reaction solution used to prepare RAFT polymer in a flow reactor may comprise one or more ethylenically unsaturated monomers, RAFT agent, non-reactive solvent and free radical initiator.

Those skilled in the art will appreciate that for the one or more ethylenically unsaturated monomers to undergo RAFT polymerisation they must be of a type that can be polymerised by a free radical process. If desired, the monomers should also be capable of being polymerised with other monomers. The factors which determine copolymerisability of various monomers are well documented in the art. For example, see: Greenlee, R. Z., in Polymer Handbook 3$^{rd}$ Edition (Brandup, J., and Immergut. E. H. Eds) Wiley: New York, 1989 p II/53.

Suitable ethylenically unsaturated monomers that may be used to prepare the RAFT polymer include those of formula (I):

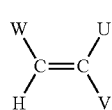

(I)

where U and W are independently selected from —$CO_2H$, —$CO_2R^1$, —$COR^1$, —$CSR^1$, —$CSOR^1$, —$COSR^1$, —$CONH_2$, —$CONHR^1$, —$CONR^1{}_2$, hydrogen, halogen and optionally substituted $C_1$-$C_4$ alkyl or U and W form together a lactone, anhydride or imide ring that may itself be optionally substituted, where the optional substituents are independently selected from hydroxy, —$CO_2H$, —$CO_2R^1$, —$COR^1$, —$CSR^1$, —$CSOR^1$, —$COSR^1$, —CN, —$CONH_2$, —$CONHR^1$, —$CONR^1{}_2$, —$OR^1$, —$SR^1$, —$O_2CR^1$, —$SCOR^1$, and —$OCSR^1$;

V is selected from hydrogen, $R^1$, —$CO_2H$, —$CO_2R^1$, —$COR^1$, —$CSR^1$, —$CSOR^1$, —$COSR^1$, —$CONH_2$, —$CONHR^1$, —$CONR^1{}_2$, —$OR^1$, —$SR^1$, —$O_2CR^1$, —$SCOR^1$, and —$OCSR^1$;

where the or each $R^1$ is independently selected from optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted arylalkyl, optionally substituted heteroarylalkyl, optionally substituted alkylaryl, optionally substituted alkylheteroaryl, and an optionally substituted polymer chain.

The or each $R^1$ may also be independently selected from optionally substituted $C_1$-$C_{22}$ alkyl, optionally substituted $C_2$-$C_{22}$ alkenyl, optionally substituted $C_2$-$C_{22}$ alkynyl, optionally substituted $C_6$-$C_{18}$ aryl, optionally substituted $C_3$-$C_{18}$ heteroaryl, optionally substituted $C_3$-$C_{18}$ carbocyclyl, optionally substituted $C_2$-$C_{18}$ heterocyclyl, optionally substituted $C_7$-$C_{24}$ arylalkyl, optionally substituted $C_4$-$C_{18}$ heteroarylalkyl, optionally substituted $C_7$-$C_{24}$ alkylaryl, optionally substituted $C_4$-$C_{18}$ alkylheteroaryl, and an optionally substituted polymer chain.

$R^1$ may also be selected from optionally substituted $C_1$-$C_{18}$ alkyl, optionally substituted $C_2$-$C_{18}$ alkenyl, optionally substituted aryl, optionally substituted heteroaryl, optionally substituted carbocyclyl, optionally substituted heterocyclyl, optionally substituted aralkyl, optionally substituted heteroarylalkyl, optionally substituted alkaryl, optionally substituted alkylheteroaryl and a polymer chain.

In one embodiment, $R^1$ may be independently selected from optionally substituted $C_1$-$C_6$ alkyl.

Examples of optional substituents for $R^1$ include those selected from alkyleneoxidyl (epoxy), hydroxy, alkoxy, acyl, acyloxy, formyl, alkylcarbonyl, carboxy, sulfonic acid, alkoxy- or aryloxy-carbonyl, isocyanato, cyano, silyl, halo, amino, including salts and derivatives thereof. Examples polymer chains include those selected from polyalkylene oxide, polyarylene ether and polyalkylene ether.

Examples of monomers of formula (I) include maleic anhydride, N-alkylmaleimide, N-arylmaleimide, dialkyl fumarate and cyclopolymerisable monomers, acrylate and methacrylate esters, acrylic and methacrylic acid, styrene, acrylamide, methacrylamide, and methacrylonitrile, mixtures of these monomers, and mixtures of these monomers with other monomers.

Other examples of monomers of formula (I) include: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylamino styrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropylacrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrolidone, N-vinylcarbazole, butadiene, ethylene and chloroprene. This list is not exhaustive.

RAFT agents suitable for preparing the RAFT polymer comprise a thiocarbonylthio group (which is a divalent moiety represented by: —C(S)S—). Examples of RAFT agents are described in Moad G.; Rizzardo, E; Thang S, H. Polymer 2008, 49, 1079-1131 (the entire contents of which are incorporated herein by reference) and include xanthate, dithioester, dithiocarbonate, dithiocarbamate and trithiocarbonate compounds, macro RAFT agents and switchable RAFT agents described in WO 10/83569.

A RAFT agent suitable for preparing the RAFT polymer may be represented by general formula (II) or (III):

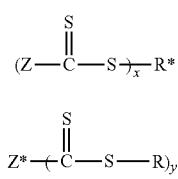

(II)

(III)

where Z and R are groups, and R* and Z* are x-valent and y-valent groups, respectively, that are independently selected such that the agent can function as a RAFT agent in the polymerisation of one or more ethylenically unsaturated monomers; x is an integer ≥1; and y is an integer ≥2.

In order to function as a RAFT agent in the polymerisation of one or more ethylenically unsaturated monomers, those skilled in the art will appreciate that R and R* will typically be an optionally substituted organic group that function as a free radical leaving group under the polymerisation conditions employed and yet, as a free radical leaving group, retain the ability to reinitiate polymerisation. Those skilled in the art will also appreciate that Z and Z* will typically be an optionally substituted organic group that function to give a suitably high reactivity of the C=S moiety in the RAFT agent towards free radical addition without slowing the rate of fragmentation of the RAFT-adduct radical to the extent that polymerisation is unduly retarded.

In formula (II), R* is a x-valent group, with x being an integer ≥1. Accordingly, R* may be mono-valent, di-valent, tri-valent or of higher valency. For example, R* may be an optionally substituted polymer chain, with the remainder of the RAFT agent depicted in formula (II) presented as multiple groups pendant from the polymer chain. Generally, x will be an integer ranging from 1 to about 20, for example from about 2 to about 10, or from 1 to about 5.

Similarly, in formula (III), Z* is a y-valent group, with y being an integer ≥2. Accordingly, Z* may be di-valent, tri-valent or of higher valency. Generally, y will be an integer ranging from 2 to about 20, for example from about 2 to about 10, or from 2 to about 5.

Examples of R in RAFT agents used in accordance with the invention include optionally substituted, and in the case of R* in RAFT agents used in accordance with the invention include a x-valent form of optionally substituted: alkyl, alkenyl, alkynyl, aryl, acyl, carbocyclyl, heterocyclyl, heteroaryl, alkylthio, alkenylthio, alkynylthio, arylthio, acylthio, carbocyclylthio, heterocyclylthio, heteroarylthio, alkylalkenyl, alkylalkynyl, alkylaryl, alkylacyl, alkylcarbocyclyl, alkylheterocyclyl, alkylheteroaryl, alkyloxyalkyl, alkenyloxyalkyl, alkynyloxyalkyl, aryloxyalkyl, alkylacyloxy, alkylcarbocyclyloxy, alkylheterocyclyloxy, alkylheteroaryloxy, alkylthioalkyl, alkenylthioalkyl, alkynylthioalkyl, arylthioalkyl, alkylacylthio, alkylcarbocyclylthio, alkylheterocyclylthio, alkylheteroarylthio, alkylalkenylalkyl, alkylalkynylalkyl, alkylarylalkyl, alkylacylalkyl, arylalkylaryl, arylalkenylaryl, arylalkynylaryl, arylacylaryl, arylacyl, arylcarbocyclyl, arylheterocyclyl, arylheteroaryl, alkenyloxyaryl, alkynyloxyaryl, aryloxyaryl, alkylthioaryl, alkenylthioaryl, alkynylthioaryl, arylthioaryl, arylacylthio, arylcarbocyclylthio, arylheterocyclylthio, arylheteroarylthio, and a polymer chain.

More specific examples of R in RAFT agents used in accordance with the invention include optionally substituted, and in the case of R* in RAFT agents used in accordance with the invention include an x-valent form of optionally substituted: $C_1$-$C_{18}$ alkyl, $C_2$-$C_{18}$ alkenyl, $C_2$-$C_{18}$ alkynyl, $C_6$-$C_{18}$ aryl, $C_1$-$C_{18}$ acyl, $C_3$-$C_{18}$ carbocyclyl, $C_2$-$C_{18}$ heterocyclyl, $C_3$-$C_{18}$ heteroaryl, $C_1$-$C_{18}$ alkylthio, $C_2$-$C_{18}$ alkenylthio, $C_2$-$C_{18}$ alkynylthio, $C_6$-$C_{18}$ arylthio, $C_1$-$C_{18}$ acylthio, $C_3$-$C_{18}$ carbocyclylthio, $C_2$-$C_{18}$ heterocyclylthio, $C_3$-$C_{18}$ heteroarylthio, $C_3$-$C_{18}$ alkylalkenyl, $C_3$-$C_{18}$ alkylalkynyl, $C_7$-$C_{24}$ alkylaryl, $C_2$-$C_{18}$ alkylacyl, $C_4$-$C_{18}$ alkylcarbocyclyl, $C_3$-$C_{18}$ alkylheterocyclyl, $C_4$-$C_{18}$ alkylheteroaryl, $C_2$-$C_{18}$ alkyloxyalkyl, $C_3$-$C_{18}$ alkenyloxyalkyl, $C_3$-$C_{18}$ alkynyloxyalkyl, $C_7$-$C_{24}$ aryloxyalkyl, $C_2$-$C_{18}$ alkylacyloxy, $C_2$-$C_{18}$ alkylthioalkyl, $C_3$-$C_{18}$ alkenylthioalkyl, $C_3$-$C_{18}$ alkynylthioalkyl, $C_7$-$C_{24}$ arylthioalkyl, $C_2$-$C_{18}$ alkylacylthio, $C_4$-$C_{18}$ alkylcarbocyclylthio, $C_3$-$C_{18}$ alkylheterocyclylthio, $C_4$-$C_{18}$ alkylheteroarylthio, $C_4$-$C_{18}$ alkylalkenylalkyl, $C_4$-$C_{18}$ alkylalkynylalkyl, $C_8$-$C_{24}$ alkylarylalkyl, $C_3$-$C_{18}$ alkylacylalkyl, $C_{13}$-$C_{24}$ arylalkylaryl, $C_{14}$-$C_{24}$ arylalkenylaryl, $C_{14}$-$C_{24}$ arylalkynylaryl, $C_{13}$-$C_{24}$ arylacylaryl, $C_7$-$C_{18}$ arylacyl, $C_9$-$C_{18}$ arylcarbocyclyl, $C_8$-$C_{18}$ arylheterocyclyl, $C_9$-$C_{18}$ arylheteroaryl, $C_8$-$C_{18}$ alkenyloxyaryl, $C_8$-$C_{18}$ alkynyloxyaryl, $C_{12}$-$C_{24}$ aryloxyaryl, alkylthioaryl, $C_8$-$C_{18}$ alkenylthioaryl, $C_8$-$C_{18}$ alkynylthioaryl, $C_{12}$-$C_{24}$ arylthioaryl, $C_7$-$C_{18}$ arylacylthio, $C_9$-$C_{18}$ arylcarbocyclylthio, $C_8$-$C_{18}$ arylheterocyclylthio, $C_9$-$C_{18}$ arylheteroarylthio, and a polymer chain having a number average molecular weight in the range of about 500 to about 80,000, for example in the range of about 500 to about 30,000

Where R in RAFT agents used in accordance with the invention include, and in the case of R* in RAFT agents used in accordance with the invention include an x-valent form of, an optionally substituted polymer chain, the polymers chain may be formed by any suitable polymerisation process such as radical, ionic, coordination, step-growth or condensation polymerisation. The polymer chains may comprise homopolymer, block polymer, multiblock polymer, gradient copolymer, or random or statistical copolymer chains and may have various architectures such as linear, star, branched, graft, or brush.

Examples of Z in RAFT agents used in accordance with the invention include optionally substituted, and in the case of Z* in RAFT agents used in accordance with the invention include a y-valent form of optionally substituted: F, Cl, Br, I, alkyl, aryl, acyl, amino, carbocyclyl, heterocyclyl, heteroaryl, alkyloxy, aryloxy, acyloxy, acylamino, carbocyclyloxy, heterocyclyloxy, heteroaryloxy, alkylthio, arylthio, acylthio, carbocyclylthio, heterocyclylthio, heteroarylthio, alkylaryl, alkylacyl, alkylcarbocyclyl, alkylheterocyclyl, alkylheteroaryl, alkyloxyalkyl, aryloxyalkyl, alkylacyloxy, alkylcarbocyclyloxy, alkylheterocyclyloxy, alkylheteroaryloxy, alkylthioalkyl, arylthioalkyl, alkylacylthio, alkylcarbocyclylthio, alkylheterocyclylthio, alkylheteroarylthio, alkylarylalkyl, alkylacylalkyl, arylalkylaryl, arylacylaryl, arylacyl, arylcarbocyclyl, arylheterocyclyl, arylheteroaryl, aryloxyaryl, arylacyloxy, arylcarbocyclyloxy, arylheterocyclyloxy, arylheteroaryloxy, alkylthioaryl, arylthioaryl, arylacylthio, arylcarbocyclylthio, arylheterocyclylthio, arylheteroarylthio, dialkyloxy-diheterocyclyloxy- or diaryloxyphosphinyl, dialkyl-, diheterocyclyl- or diaryl-phosphinyl, cyano (i.e. —CN), and —S—R, where R is as defined in respect of formula (III).

More specific examples of Z in RAFT agents used in accordance with the invention include optionally substituted, and in the case of Z* in RAFT agents used in accordance with the invention include a y-valent form of optionally substituted: F, Cl, $C_1$-$C_{18}$ alkyl, $C_6$-$C_{18}$ aryl, $C_1$-$C_{18}$ acyl, amino, $C_3$-$C_{18}$ carbocyclyl, $C_2$-$C_{18}$ heterocyclyl, $C_3$-$C_{18}$ heteroaryl, $C_1$-$C_{18}$ alkyloxy, $C_6$-$C_{18}$ aryloxy, $C_1$-$C_{18}$ acyloxy, $C_3$-$C_{18}$ carbocyclyloxy, $C_2$-$C_{18}$ heterocyclyloxy, $C_3$-$C_{18}$ heteroaryloxy, $C_1$-$C_{18}$ alkylthio, $C_6$-$C_{18}$ arylthio, $C_1$-$C_{18}$ acylthio, $C_3$-$C_{18}$ carbocyclylthio, $C_2$-$C_{18}$ heterocyclylthio, $C_3$-$C_{18}$ heteroarylthio, $C_7$-$C_{24}$ alkylaryl, $C_2$-$C_{18}$ alkylacyl, $C_4$-$C_{18}$ alkylcarbocyclyl, $C_3$-$C_{18}$ alkylheterocyclyl, $C_4$-$C_{18}$ alkylheteroaryl, $C_2$-$C_{18}$ alkyloxyalkyl, $C_7$-$C_{24}$ aryloxyalkyl, $C_2$-$C_{18}$ alkylacyloxy, $C_4$-$C_{18}$ alkylcarbocyclyloxy, $C_3$-$C_{18}$ alkylheterocyclyloxy, $C_4$-$C_{18}$ alkylheteroaryloxy, $C_2$-$C_{18}$ alkylthioalkyl, $C_7$-$C_{24}$ arylthioalkyl, $C_2$-$C_{18}$ alkylacylthio, $C_4$-$C_{18}$ alkylcarbocyclylthio, $C_3$-$C_{18}$ alkylheterocyclylthio, $C_4$-$C_{18}$ alkylheteroarylthio, $C_8$-$C_{24}$ alkylarylalkyl, $C_3$-$C_{18}$ alkylacylalkyl, $C_{13}$-$C_{24}$ arylalkylaryl, $C_{13}$-$C_{24}$ arylacylaryl, $C_7$-$C_{18}$ arylacyl, $C_9$-$C_{18}$ arylcarbocyclyl, $C_8$-$C_{18}$ arylheterocyclyl, $C_9$-$C_{18}$ arylheteroaryl, $C_{12}$-$C_{24}$ aryloxyaryl, $C_7$-$C_{18}$ arylacyloxy, $C_9$-$C_{18}$ arylcarbocyclyloxy, $C_8$-$C_{18}$ arylheterocyclyloxy, $C_9$-$C_{18}$ arylheteroaryloxy, $C_7$-$C_{18}$ alkylthioaryl, $C_{12}$-$C_{24}$ arylthioaryl, $C_7$-$C_{18}$ arylacylthio, $C_9$-$C_{18}$ arylcarbocyclylthio, $C_8$-$C_{18}$ arylheterocyclylthio, $C_9$-$C_{18}$ arylheteroarylthio, dialkyloxy-, diheterocyclyloxy- or diaryloxy-phosphinyl (i.e. —P(=O)OR$^k_2$), dialkyl-, diheterocyclyl- or diarylphosphinyl (i.e. —P(=O)R$^k_2$), where R$^k$ is selected from optionally substituted $C_1$-$C_{18}$ alkyl, optionally substituted $C_6$-$C_{18}$ aryl, optionally substituted $C_2$-$C_{18}$ heterocyclyl, and optionally substituted $C_7$-$C_{24}$ alkylaryl, cyano (i.e. —CN), and —S—R, where R is as defined in respect of formula (III).

In one embodiment, the RAFT agent used in accordance with the invention is a trithiocarbonate RAFT agent and Z or Z* is an optionally substituted alkylthio group.

In the lists herein defining groups from which Z, Z*, R and R* may be selected, each group within the lists (e.g. alkyl, alkenyl, alkynyl, aryl, carbocyclyl, heteroaryl, heterocyclyl, and polymer chain moiety) may be optionally substituted. For avoidance of any doubt, where a given Z, Z*, R or R* contains two or more of such moieties (e.g. alkylaryl), each of such moieties may be optionally substituted with one, two, three or more optional substituents as herein defined.

In the lists herein defining groups from which Z, Z*, R and R* may be selected, where a given Z, Z*, R or R* contains two or more subgroups (e.g. [group A][group B]), the order of the subgroups is not intended to be limited to the order in which they are presented. Thus, a Z, Z*, R or R* with two subgroups defined as [group A][group B] (e.g. alkylaryl) is intended to also be a reference to a Z, Z*, R or R* with two subgroups defined as [group B][group A] (e.g. arylalkyl).

The Z, Z*, R or R* may be branched and/or optionally substituted. Where the Z, Z*, R or R* comprises an optionally substituted alkyl moiety, an optional substituent includes where a —CH$_2$— group in the alkyl chain is replaced by a group selected from —O—, —S—, —NR$^a$—, —C(O)— (i.e. carbonyl), —C(O)O— (i.e. ester), and —C(O)NR$^a$— (i.e. amide), where R$^a$ may be selected from hydrogen, alkyl, alkenyl, alkynyl, aryl, carbocyclyl, heteroaryl, heterocyclyl, arylalkyl, and acyl.

Reference herein to a x-valent, y-valent, multi-valent or di-valent "form of . . . " is intended to mean that the specified group is a x-valent, y-valent, multi-valent or di-valent radical, respectively. For example, where x or y is 2, the specified group is intended to be a divalent radical. In that case, a divalent alkyl group is in effect an alkylene group (e.g. —CH$_2$—). Similarly, the divalent form of the group alkylaryl may, for example, be represented by —(C$_6$H$_4$)—CH$_2$—, a divalent alkylarylalkyl group may, for example, be represented by —CH$_2$—(C$_6$H$_4$)—CH$_2$—, a divalent alkyloxy group may, for example, be represented by —CH$_2$—O—, and a divalent alkyloxyalkyl group may, for example, be represented by —CH$_2$—O—CH$_2$—. Where the term "optionally substituted" is used in combination with such a x-valent, y-valent, multi-valent or di-valent groups, that group may or may not be substituted or fused as herein described. Where the x-valent, y-valent, multi-valent, di-valent groups comprise two or more subgroups, for example [group A][group B][group C] (e.g. alkylarylalkyl), if viable one or more of such subgroups may be optionally substituted. Those skilled in the art will appreciate how to apply this rationale in providing for higher valent forms.

Solvent used in the process of preparing RAFT polymer in the flow reactor may be the same as that described herein.

In order for polymerisation of monomer to proceed and produce RAFT polymer, free radicals must be generated within the flow reactor. A source of initiating radicals can be provided by any suitable means of generating free radicals, such as by the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X- or gamma-radiation. The initiating system is chosen such that under the reaction conditions there is no substantial adverse interaction between the initiator or the initiating radicals and the components of the reaction solution under the conditions of the reaction. Where the initiating radicals are generated from monomer per se, it will be appreciated that the monomer may be considered to be the free radical initiator. In other words, provided that the required free radicals are generated the process is not limited to a situation where a dedicated or primary functional free radical initiator must be used. The initiator selected should also have the requisite solubility in the solvent.

Thermal initiators are generally chosen to have an appropriate half life at the temperature of polymerisation. These initiators can include one or more of the following compounds:

2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramidine), 2,2'-azobis{2-methyl-N-[1,1-bis(hydroxymethyl)-2-hydroxyethyl]propionamide}, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. This list is not exhaustive.

Photochemical initiator systems are generally chosen to have an appropriate quantum yield for radical production under the conditions of the polymerisation. Examples include benzoin derivatives, benzophenone, acyl phosphine oxides, and photo-redox systems.

Redox initiator systems are generally chosen to have an appropriate rate of radical production under the conditions of the polymerisation; these initiating systems can include, but are not limited to, combinations of the following oxidants and reductants:

oxidants: potassium, peroxydisulfate, hydrogen peroxide, t-butyl hydroperoxide.

reductants: iron (II), titanium (III), potassium thiosulfite, potassium bisulfite.

Other suitable initiating systems are described in commonly available texts. See, for example, Moad and Solomon "the Chemistry of Free Radical Polymerisation", Pergamon, London, 1995, pp 53-95.

Initiators that are more readily solvated in hydrophilic media include, but are not limited to, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine) dihydrochloride, 2,2'-azobis (2-amidinopropane) dihydrochloride, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide) dihydrate, and derivatives thereof.

Initiators that are more readily solvated in hydrophobic media include azo compounds exemplified by the well known material 2,2'-azobisisobutyronitrile. Other suitable initiator compounds include the acyl peroxide class such as acetyl and benzoyl peroxide as well as alkyl peroxides such as cumyl and t-butyl peroxides. Hydroperoxides such as t-butyl and cumyl hydroperoxides are also widely used.

Selection of a given flow reactor for preparing RAFT polymer will generally need to be done with regard to the manner in which the free radicals are to be generated. For example, if the free radicals are to be generated by the thermally induced homolytic scission of a suitable compound, the flow reactor will need to be selected such that heat can be applied to it in a manner that causes the temperature of reaction solution contained therein to be raised as required. Alternatively, if the free radicals are to be generated by a photochemical means, then the flow reactor should be selected such that it is suitably transparent to the photo initiating means. Those skilled in the art will be able to select an appropriate free radical initiator system for use with a given flow reactor system.

The feature of "promoting" RAFT polymerisation of the one or more ethylenically unsaturated monomers within the reactor is therefore the act of generating free radicals within the reaction solution so as to initiate polymerisation of the monomers under the control of the RAFT agent. The means for "promoting" the polymerisation will vary depending upon the manner in which the radicals are to be generated. For example, if a thermal initiator is employed, polymerisation may be promoted by applying heat to the flow reactor. Alternatively, if a photo initiator is employed, polymerisation may be promoted by applying an appropriate wavelength of light to a suitably transparent flow reactor.

In one embodiment, RAFT polymerisation is promoted by applying heat to the flow reactor.

Upon promoting RAFT solution polymerisation of the one or more ethylenically unsaturated monomers within the reactor, a polymer solution is formed which flows out of the reactor. By "polymer solution" in this context is meant polymer formed by the RAFT polymerisation that is dissolved in the solvent.

As used herein, the term "alkyl", used either alone or in compound words denotes straight chain, branched or cyclic alkyl, preferably $C_{1-20}$ alkyl, e.g. $C_{1-10}$ or $C_{1-6}$. Examples of straight chain and branched alkyl include methyl, ethyl, n-propyl, isopropyl, n-butyl, sec-butyl, t-butyl, n-pentyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as "propyl", butyl" etc, it will be understood that this can refer to any of straight, branched and cyclic isomers where appropriate. An alkyl group may be optionally substituted by one or more optional substituents as herein defined.

The term "alkenyl" as used herein denotes groups formed from straight chain, branched or cyclic hydrocarbon residues containing at least one carbon to carbon double bond including ethylenically mono-, di- or polyunsaturated alkyl or cycloalkyl groups as previously defined, preferably $C_{2-20}$ alkenyl (e.g. $C_{2-10}$ or $C_{2-6}$). Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substituents as herein defined.

As used herein the term "alkynyl" denotes groups formed from straight chain, branched or cyclic hydrocarbon residues containing at least one carbon-carbon triple bond including ethylenically mono-, di- or polyunsaturated alkyl or cycloalkyl groups as previously defined. Unless the number of carbon atoms is specified the term preferably refers to $C_{2-20}$ alkynyl (e.g. $C_{2-10}$ or $C_{2-6}$). Examples include ethynyl, 1-propynyl, 2-propynyl, and butynyl isomers, and pentynyl isomers. An alkynyl group may be optionally substituted by one or more optional substituents as herein defined.

The term "halogen" ("halo") denotes fluorine, chlorine, bromine or iodine (fluoro, chloro, bromo or iodo).

The term "aryl" (or "carboaryl") denotes any of single, polynuclear, conjugated and fused residues of aromatic hydrocarbon ring systems (e.g. $C_{6-24}$ or $C_{6-18}$). Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Preferred aryl include phenyl and naphthyl. An aryl group may or may not be optionally substituted by one or more optional substituents as herein defined. The term "arylene" is intended to denote the divalent form of aryl.

The term "carbocyclyl" includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-6-membered or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl. A carbocyclyl group may be optionally substituted by one or more optional substituents as herein defined. The term "carbocyclylene" is intended to denote the divalent form of carbocyclyl.

The term "heteroatom" or "hetero" as used herein in its broadest sense refers to any atom other than a carbon atom which may be a member of a cyclic organic group. Particular examples of heteroatoms include nitrogen, oxygen, sulfur, phosphorous, boron, silicon, selenium and tellurium, more particularly nitrogen, oxygen and sulfur.

The term "heterocyclyl" when used alone or in compound words includes any of monocyclic, polycyclic, fused or conjugated hydrocarbon residues, preferably $C_{3-20}$ (e.g. $C_{3-10}$ or $C_{3-8}$) wherein one or more carbon atoms are replaced by a heteroatom so as to provide a non-aromatic residue. Suitable heteroatoms include O, N, S, P and Se, particularly O, N and S. Where two or more carbon atoms are replaced, this may be by two or more of the same heteroatom or by different heteroatoms. The heterocyclyl group may be saturated or partially unsaturated, i.e. possess one or more double bonds. Particularly preferred heterocyclyl are 5-6 and 9-10 membered heterocyclyl. Suitable examples of heterocyclyl groups may include azridinyl, oxiranyl, thiiranyl, azetidinyl, oxetanyl, thietanyl, 2H-pyrrolyl, pyrrolidinyl, pyrrolinyl, piperidyl, piperazinyl, morpholinyl, indolinyl, imidazolidinyl, imidazolinyl, pyrazolidinyl, thiomorpholinyl, dioxanyl, tetrahydrofuranyl, tetrahydropyranyl, tetrahydropyrrolyl, tetrahydrothiophenyl, pyrazolinyl, dioxalanyl, thiazolidinyl, isoxazolidinyl, dihydropyranyl, oxazinyl, thiazinyl, thiomorpholinyl, oxathianyl, dithianyl, trioxanyl, thiadiazinyl, dithiazinyl, trithianyl, azepinyl, oxepinyl, thiepinyl, indenyl, indanyl, 3H-indolyl, isoindolinyl, 4H-quinolazinyl, chromenyl, chromanyl, isochromanyl, pyranyl and dihydropyranyl. A heterocyclyl group may be optionally substituted by one or more optional substituents as herein defined. The term "heterocyclylene" is intended to denote the divalent form of heterocyclyl.

The term "heteroaryl" includes any of monocyclic, polycyclic, fused or conjugated hydrocarbon residues, wherein one or more carbon atoms are replaced by a heteroatom so as to provide an aromatic residue. Preferred heteroaryl have 3-20 ring atoms, e.g. 3-10. Particularly preferred heteroaryl are 5-6 and 9-10 membered bicyclic ring systems. Suitable heteroatoms include, O, N, S, P and Se, particularly O, N and S. Where two or more carbon atoms are replaced, this may be by two or more of the same heteroatom or by different heteroatoms. Suitable examples of heteroaryl groups may include pyridyl, pyrrolyl, thienyl, imidazolyl, furanyl, benzothienyl, isobenzothienyl, benzofuranyl, isobenzofuranyl, indolyl, isoindolyl, pyrazolyl, pyrazinyl, pyrimidinyl, pyridazinyl, indolizinyl, quinolyl, isoquinolyl, phthalazinyl, 1,5-naphthyridinyl, quinozalinyl, quinazolinyl, quinolinyl, oxazolyl, thiazolyl, isothiazolyl, isoxazolyl, triazolyl, oxadialzolyl, oxatriazolyl, triazinyl, and furazanyl. A heteroaryl group may be optionally substituted by one or more optional substituents as herein defined. The term "heteroarylene" is intended to denote the divalent form of heteroaryl.

The term "acyl" either alone or in compound words denotes a group containing the moiety C=O (and not being a carboxylic acid, ester or amide) Preferred acyl includes C(O)—$R^e$, wherein $R^e$ is hydrogen or an alkyl, alkenyl, alkynyl, aryl, heteroaryl, carbocyclyl, or heterocyclyl residue. Examples of acyl include formyl, straight chain or branched alkanoyl (e.g. $C_{1-20}$) such as acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl]; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. The $R^e$ residue may be optionally substituted as described herein.

The term "sulfoxide", either alone or in a compound word, refers to a group —S(O)$R^f$ wherein $R^f$ is selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl.

The term "sulfonyl", either alone or in a compound word, refers to a group S(O)$_2$—$R^f$, wherein $R^f$ is selected from hydrogen, alkyl, alkenyl, alkynyl, aryl, heteroaryl, heterocyclyl, carbocyclyl and aralkyl. Examples of preferred $R^f$ include $C_{1-20}$alkyl, phenyl and benzyl.

The term "sulfonamide", either alone or in a compound word, refers to a group S(O)NR$^f$R$^f$ wherein each $R^f$ is independently selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl. In one embodiment at least one $R^f$ is hydrogen. In another embodiment, both $R^f$ are hydrogen.

The term, "amino" is used here in its broadest sense as understood in the art and includes groups of the formula NR$^a$R$^b$ wherein $R^a$ and $R^b$ may be any independently selected from hydrogen, alkyl, alkenyl, alkynyl, aryl, carbocyclyl, heteroaryl, heterocyclyl, arylalkyl, and acyl. $R^a$ and $R^b$, together with the nitrogen to which they are attached, may also form a monocyclic, or polycyclic ring system e.g. a 3-10 membered ring, particularly, 5-6 and 9-10 membered systems. Examples of "amino" include $NH_2$, NHalkyl (e.g. $C_{1-20}$alkyl), NHaryl (e.g. NHphenyl), NHaralkyl (e.g. NHbenzyl), NHacyl (e.g. NHC(O)$C_{1-20}$alkyl, NHC(O)phenyl), Nalkylalkyl (wherein each alkyl, for example $C_{1-20}$, may be the same or different) and 5 or 6 membered rings, optionally containing one or more same or different heteroatoms (e.g. O, N and S).

The term "amido" is used here in its broadest sense as understood in the art and includes groups having the formula $C(O)NR^aR^b$, wherein $R^a$ and $R^b$ are as defined as above. Examples of amido include $C(O)NH_2$, C(O)NHalkyl (e.g. $C_{1-20}$alkyl), C(O)NHaryl (e.g. C(O)NHphenyl), —C(O)NHaralkyl (e.g. C(O)NHbenzyl), —C(O)NHacyl (e.g. C(O)NHC(O)$C_{1-20}$alkyl, C(O)NHC(O)phenyl), C(O)Nalkylalkyl (wherein each alkyl, for example $C_{1-20}$, may be the same or different) and 5 or 6 membered rings, optionally containing one or more same or different heteroatoms (e.g. O, N and S).

The term "carboxy ester" is used here in its broadest sense as understood in the art and includes groups having the formula $CO_2R^g$, wherein $R^g$ may be selected from groups including alkyl, alkenyl, alkynyl, aryl, carbocyclyl, heteroaryl, heterocyclyl, aralkyl, and acyl. Examples of carboxy ester include $CO_2C_{1-20}$alkyl, $CO_2$aryl (e.g. $CO_2$phenyl), $CO_2$aralkyl (e.g. $CO_2$ benzyl).

As used herein, the term "aryloxy" refers to an "aryl" group attached through an oxygen bridge. Examples of aryloxy substituents include phenoxy, biphenyloxy, naphthyloxy and the like.

As used herein, the term "acyloxy" refers to an "acyl" group wherein the "acyl" group is in turn attached through an oxygen atom. Examples of "acyloxy" include hexylcarbonyloxy (heptanoyloxy), cyclopentylcarbonyloxy, benzoyloxy, 4-chlorobenzoyloxy, decylcarbonyloxy (undecanoyloxy), propylcarbonyloxy (butanoyloxy), octylcarbonyloxy (nonanoyloxy), biphenylcarbonyloxy (eg 4-phenylbenzoyloxy), naphthylcarbonyloxy (eg 1-naphthoyloxy) and the like.

As used herein, the term "alkyloxycarbonyl" refers to a "alkyloxy" group attached through a carbonyl group. Examples of "alkyloxycarbonyl" groups include butylformate, sec-butylformate, hexylformate, octylformate, decylformate, cyclopentylformate and the like. As used herein, the term "arylalkyl" refers to groups formed from straight or branched chain alkanes substituted with an aromatic ring. Examples of arylalkyl include phenylmethyl (benzyl), phenylethyl and phenylpropyl.

As used herein, the term "alkylaryl" refers to groups formed from aryl groups substituted with a straight chain or branched alkane. Examples of alkylaryl include methylphenyl and isopropylphenyl.

In this specification "optionally substituted" is taken to mean that a group may or may not be substituted or fused (so as to form a condensed polycyclic group) with one, two, three or more of organic and inorganic groups, including those selected from: alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, haloalkenyl, haloalkynyl, haloaryl, halocarbocyclyl, haloheterocyclyl, haloheteroaryl, haloacyl, haloaryalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheteroaryl, nitrocarbocyclyl, nitroacyl, nitroaralkyl, amino ($NH_2$), alkylamino, dialkylamino, alkenylamino, alkynylamino, arylamino, diarylamino, aralkylamino, diaralkylamino, acylamino, diacylamino, heterocyclamino, heteroarylamino, carboxy, carboxyester, amido, alkylsulphonyloxy, arylsulphenyloxy, alkylsulphenyl, arylsulphenyl, thio, alkylthio, alkenylthio, alkynylthio, arylthio, aralkylthio, carbocyclylthio, heterocyclylthio, heteroarylthio, acylthio, sulfoxide, sulfonyl, sulfonamide, aminoalkyl, aminoalkenyl, aminoalkynyl, aminocarbocyclyl, aminoaryl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formylalkenyl, formylalkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonylalkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocyclyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate, phosphate, triarylmethyl, triarylamino, oxadiazole, and carbazole groups. Optional substitution may also be taken to refer to where a —$CH_2$— group in a chain or ring is replaced by a group selected from —O—, —S—, —$NR^a$—, —C(O)— (i.e. carbonyl), —C(O)O— (i.e. ester), and —C(O)$NR^a$— (i.e. amide), where $R^a$ is as defined herein.

Preferred optional substituents include alkyl, (e.g. $C_{1-6}$ alkyl such as methyl, ethyl, propyl, butyl, cyclopropyl, cyclobutyl, cyclopentyl or cyclohexyl), hydroxyalkyl (e.g. hydroxymethyl, hydroxyethyl, hydroxypropyl), alkoxyalkyl (e.g. methoxymethyl, methoxyethyl, methoxypropyl, ethoxymethyl, ethoxyethyl, ethoxypropyl etc) alkoxy (e.g. $C_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted e.g., by $C_{1-6}$ alkyl, halo, hydroxy, hydroxy$C_{1-6}$ alkyl, $C_{1-6}$ alkoxy, halo$C_{1-6}$alkyl, cyano, nitro OC(O)$C_{1-6}$ alkyl, and amino), benzyl (wherein benzyl itself may be further substituted e.g., by $C_{1-6}$ alkyl, halo, hydroxy, hydroxy$C_{1-6}$alkyl, $C_{1-6}$ alkoxy, halo$C_{1-6}$ alkyl, cyano, nitro OC(O)$C_{1-6}$ alkyl, and amino), phenoxy (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), benzyloxy (wherein benzyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro $OC(O)C_{1-6}$ alkyl, and amino), amino, alkylamino (e.g. $C_{1-6}$ alkyl, such as methylamino, ethylamino, propylamino etc), dialkylamino (e.g. $C_{1-6}$ alkyl, such as dimethylamino, diethylamino, dipropylamino), acylamino (e.g. $NHC(O)CH_3$), phenylamino (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro $OC(O)C_{1-6}$ alkyl, and amino), nitro, formyl, —C(O)-alkyl (e.g. $C_{1-6}$ alkyl, such as acetyl), O—C(O)-alkyl (e.g. $C_{1-6}$alkyl, such as acetyloxy), benzoyl (wherein the phenyl group itself may be further substituted e.g., by $C_{1-6}$ alkyl, halo, hydroxy hydroxy$C_{1-6}$ alkyl, $C_{1-6}$ alkoxy, halo$C_{1-6}$ alkyl, cyano, nitro $OC(O)C_{1-6}$alkyl, and amino), replacement of $CH_2$ with C=O, $CO_2H$, $CO_2$alkyl (e.g. $C_{1-6}$ alkyl such as methyl ester, ethyl ester, propyl ester, butyl ester), $CO_2$phenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro $OC(O)C_{1-6}$ alkyl, and amino), $CONH_2$, CONHphenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro $OC(O)C_{1-6}$ alkyl, and amino), CONHbenzyl (wherein benzyl itself may be further substituted e.g., by $C_{1-6}$ alkyl, halo, hydroxy hydroxyl $C_{1-6}$ alkyl, $C_{1-6}$ alkoxy, halo $C_{1-6}$ alkyl, cyano, nitro $OC(O)C_{1-6}$ alkyl, and amino), CONHalkyl (e.g. $C_{1-6}$ alkyl such as methyl ester, ethyl ester, propyl ester, butyl amide) CONHdialkyl (e.g. $C_{1-6}$ alkyl) aminoalkyl (e.g., HN $C_{1-6}$ alkyl-, $C_{1-6}$alkylHN—$C_{1-6}$ alkyl- and $(C_{1-6}$ alkyl$)_2$N—$C_{1-6}$ alkyl-), thioalkyl (e.g., HS $C_{1-6}$ alkyl-), carboxyalkyl (e.g., $HO_2CC_{1-6}$ alkyl-), carboxyesteralkyl (e.g., $C_{1-6}$ alkyl$O_2CC_{1-6}$ alkyl-), amidoalkyl (e.g., $H_2N(O)CC_{1-6}$ alkyl-, $H(C_{1-6}$ alkyl$)N(O)CC_{1-6}$ alkyl-), formylalkyl (e.g., $OHCC_{1-6}$alkyl-), acylalkyl (e.g., $C_{1-6}$ alkyl(O)$CC_{1-6}$ alkyl-), nitroalkyl (e.g., $O_2NC_{1-6}$ alkyl-), sulfoxidealkyl (e.g., $R(O)SC_{1-6}$ alkyl, such as $C_{1-6}$ alkyl(O)$SC_{1-6}$ alkyl-), sulfonylalkyl (e.g., $R(O)_2SC_{1-6}$ alkyl- such as $C_{1-6}$ alkyl(O)$_2SC_{1-6}$ alkyl-), sulfonamidoalkyl (e.g., $_2$HRN(O)$SC_{1-6}$ alkyl, $H(C_{1-6}$ alkyl$)N(O)SC_{1-6}$ alkyl-), triarylmethyl, triarylamino, oxadiazole, and carbazole.

The invention will now be described with reference to the following non-limiting examples.

EXAMPLES

Materials, Equipment and Operation Methods

Initiators azobis(isobutyronitrile) (AIBN), azobis(cyclohexanenitrile) (ACHN), and azobis[2-methyl-N-(2-hydroxyethyl)propionamide] (AMHP) were obtained from Acros, Dupont and Wako, respectively. RAFT agents 1a-c were synthesized in house and RAFT agent 1d and 1e were purchased from Sigma Aldrich and purified before use (see structures below). The monomers N-isopropyl acrylamide (NIPAM) and N-(2-hydroxypropyl) methacrylamide (HPMA) were used as obtained and the monomers methyl acrylate (MA), n-butyl acrylate (nBA), N,N-dimethyl acrylamide (DMA), methyl methacrylate (MMA) and styrene were pre-treated using polymer resin (for removal of hydroquinone and monomethyl ether hydroquinone, Sigma Aldrich, Cat. No: 31, 133-2) in order to remove the polymerization inhibitor. The reagents hexylamine, benzylamine and N-ethylpiperidine hypophosphite (EPHP) and Quadrapure BZA were obtained from Sigma-Aldrich and used without further purification. Diethylenetriamine resin (DETA) was obtained from Polymer Laboratories and used without further purification. The solvents acetonitrile (MeCN), ethyl acetate (EtOAc), toluene, methanol and petroleum benzene (60-80) were obtained from Merck KGaA; anisole was obtained from BDH Chemicals Ltd.; they were all used without further purification.

Reaction conversions were calculated from $^1$H-NMR spectra and/or UV spectra. For calculating the conversion of polymerization, 1,3,5-trioxane was used as an internal standard for NMR. $^1$H NMR spectra were recorded on a Bruker AC-400 spectrometer in deuterated chloroform (solvent residual as internal reference: δ=7.26 ppm) or deuterated water (solvent residual as internal reference: δ=4.79 ppm). Average molecular weight of the polymer, $M_n$ and its polydispersity index, PDI, were measured using gel permeation chromatography (GPC) on one of two systems: 1) a Shimadzu system equipped with a CMB-20A controller system, a SIL-20A HT autosampler, a LC-20AT tandem pump system, a DGU-20A degasser unit, a CTO-20AC column oven, a RDI-10A refractive index (RI) detector, and a PL Rapide (Varian) column. N,N-dimethylacetamide (DMAc) (containing 2.1 g/l LiCl) was used as eluent at a flow rate of 1 ml/min (pressure range: 750-800 psi). The column temperature was set to 80° C. and the temperature at the RI detector was set to 35° C. 2) a system using a Waters 2695 Separation Module, with tetrahydrofuran (THF) at 1.0 ml/min as eluent. The GPCs were calibrated with narrow dispersity polystyrene and poly-MMA standards, and molecular weights are reported as polystyrene or poly-MMA equivalents. $M_n$ and PDI were evaluated using Waters Millennium or Shimadzu software. A polynomial was used to fit the log M vs. time calibration curve, which was linear across the molecular weight ranges.

RAFT agent structures 1a-1e.

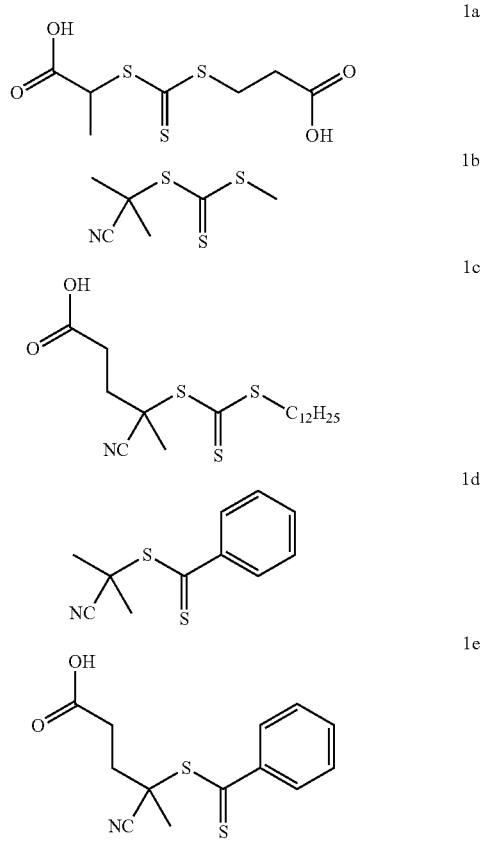

Example 1

Figure 8:
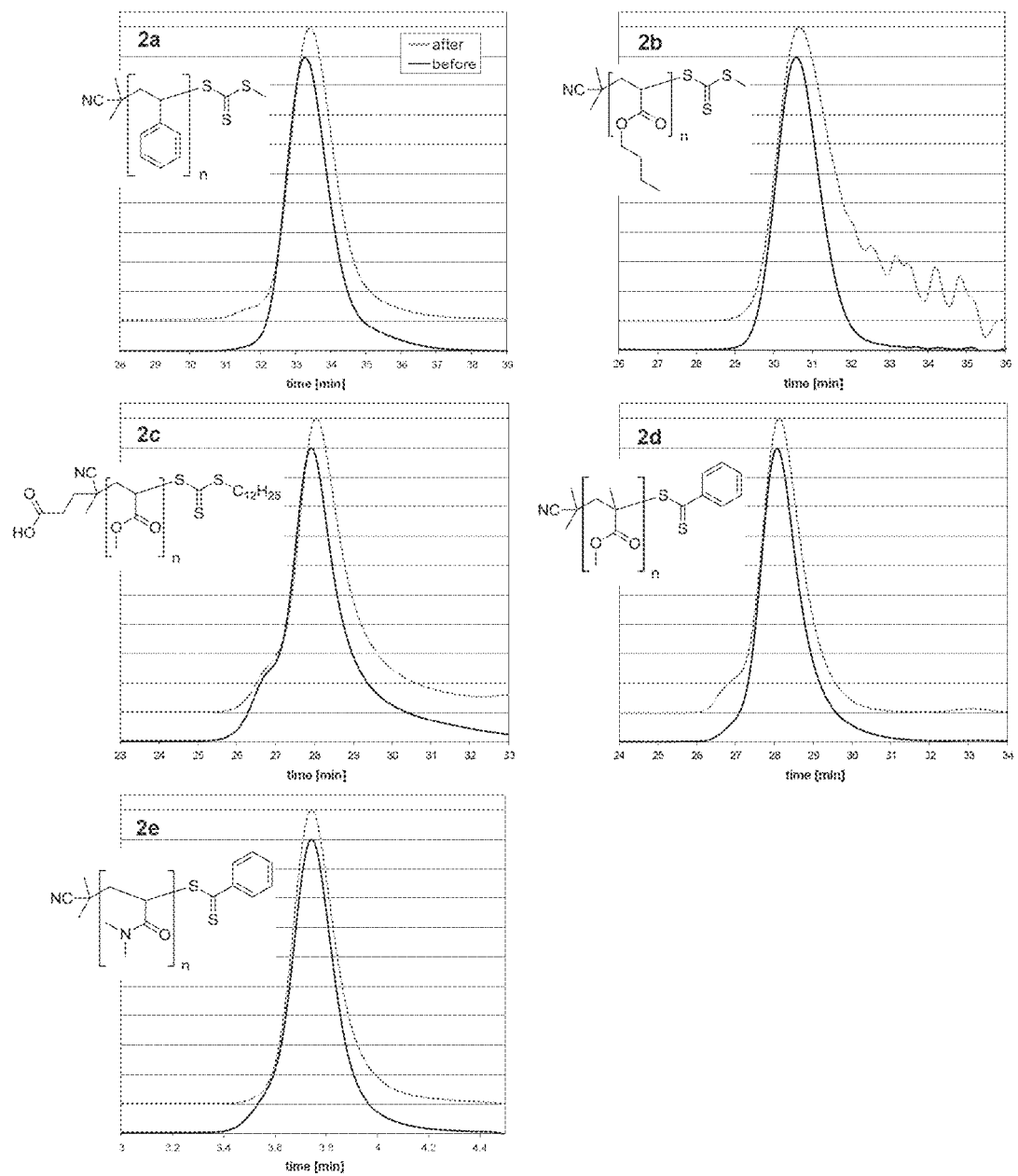
FIG. 8 shows gel permeation chromatography data of polymers 2a-e, black graphs, after polymerisation (before thermolysis); and red graphs (after flow thermolysis).
Figure 9:
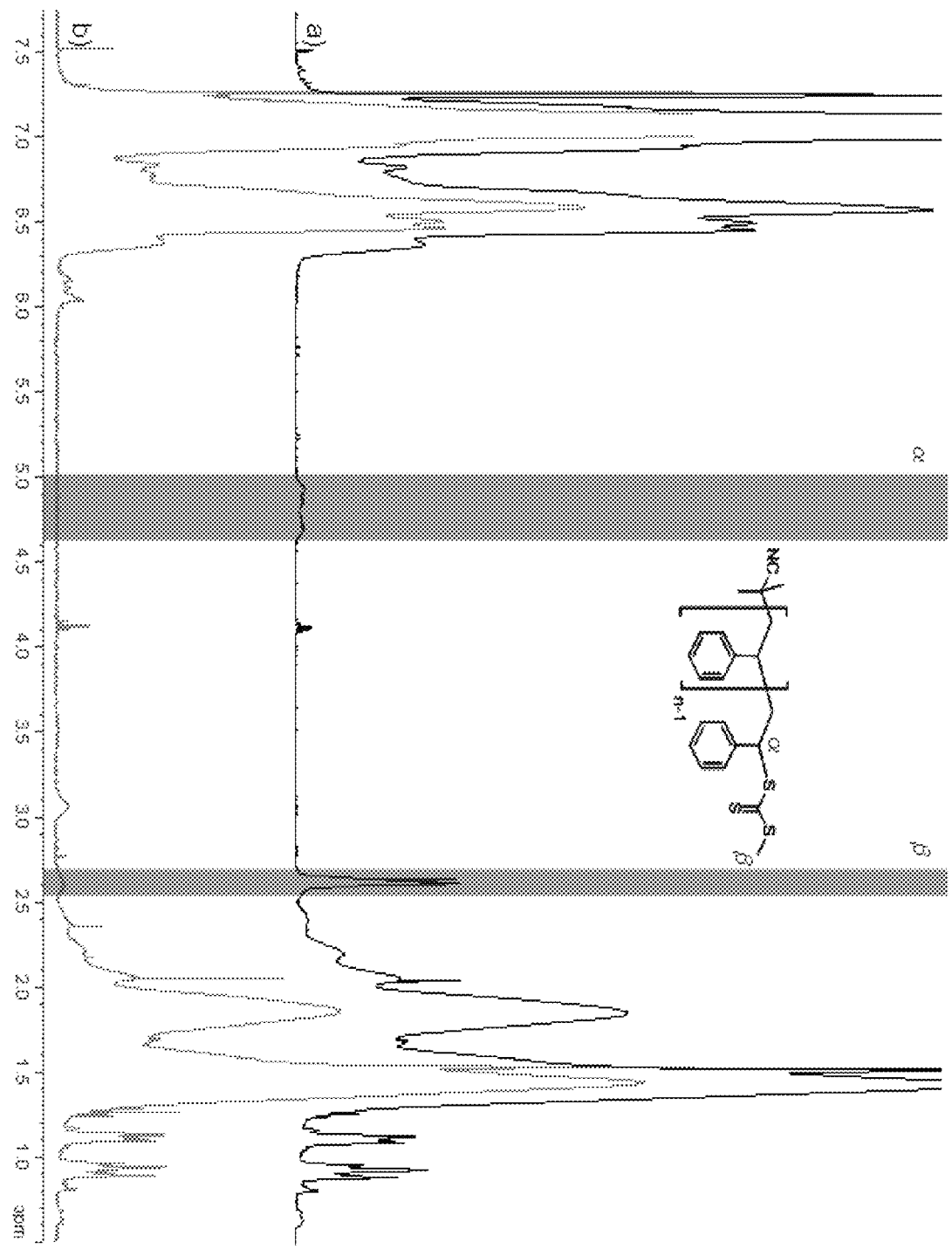
FIG. 9 shows $^1$H NMR spectra of polystyrene, 2a, before (a) and after (b) flow thermolysis. Conversion was determined by the proton signals $\alpha$ and $\beta$ on the —CHR— and —CH$_3$ groups, situated within the polymer backbone adjacent to the thiocarbonylthio group and within the thiocarbonylthio group.
Figure 10:
FIG. 10 shows PMMA, 2d, before (left) and after (right) flow thermolysis.

Continuous Flow Process for the Removal of Thiocarbonylthio Groups from RAFT Polymers Via Thermolysis Thermolysis presents a fast and efficient way of eliminating the thiocarbonylthio end-groups from RAFT polymers. The continuous production of narrow molecular weight distribution thiocarbonylthio-free RAFT polymer using thermolysis was performed in either a single or a two-step flow process. The single step thermolysis process uses previously prepared polymer solution as feedstock, while the two-step flow process consists of a polymer synthesis step followed by a subsequent removal of the thiocarbonylthio end-group via thermolysis, without the need for isolation of intermediates. A range of different polymers including acrylates, methacrylate and acrylamide and different RAFT agents were successfully tested for high temperature thermolysis between 220 and 250° C. in a stainless steel tube flow reactor, resulting in complete conversion to sulfur free polymers (see Scheme 3). Comparative analytical studies were undertaken, where small polymer samples were thermolysed on a Thermogravimetric Analyser (TGA), and both flow and TGA results are presented in Table 1. FIG. 8 shows GPC results of polymers 2a-e before and after thermolysis, FIG. 9 shows NMR spectra of polymer 2a before and after thermolysis, and FIG. 10 shows a photographic image of polymer 2d before and after thermolysis.

Scheme 3. Thermolysis of RAFT polymers for the removal of thiocarbonylthio groups.

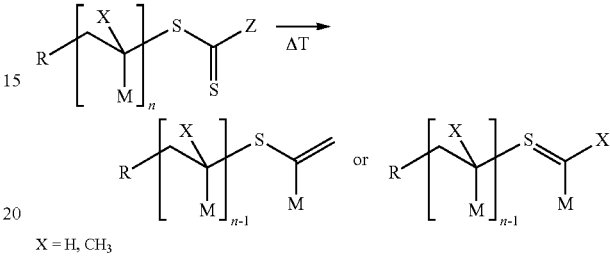

$X = H, CH_3$

TABLE 1

. Experimental conditions and results for the flow thermolysis and TGA of various RAFT polymers

| polymer | method[a] | solvent | T [° C.] | t [h][b] | conv. [%] | $M_n$ [g/mol] | PDI [-] |
|---|---|---|---|---|---|---|---|
| 2a | FT | toluene | 220 | 1 | ~100 | 3000 | 1.15 |
|  | TGA | — | 220 | 1 | ~100 | 3400 | 1.10 |
| 2b | FT | toluene | 220 | 1 | 95 | 1500 | 1.41 |
|  | TGA | — | 220 | 3 | 93 | 2500 | 1.28 |
| 2c | FT | toluene | 250 | 1 | 87 | 7400 | 1.25 |
|  | TGA | — | 250 | 3 | ~100 | 7900 | 1.32 |

TABLE 1-continued

Experimental conditions and results for the flow thermolysis and TGA of various RAFT polymers

| polymer | method[a] | solvent | T [°C.] | t [h][b] | conv. [%] | $M_n$ [g/mol] | PDI [—] |
|---|---|---|---|---|---|---|---|
| 2d | FT | toluene | 220 | 1 | ~100 | 8300 | 1.12 |
|  | TGA | — | 220 | 3 | ~100 | 7700 | 1.13 |

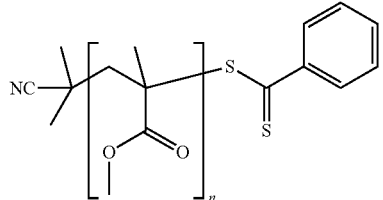

| 2e | FT | anisole | 250 | 1 | ~100 | 8800 | 1.16 |
|  | TGA | — | 250 | 3 | ~100 | 9600 | 1.23 |

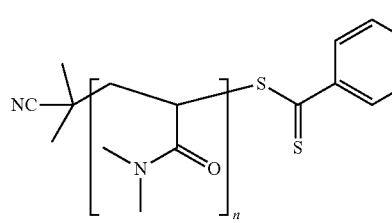

[a]processing method: flow thermolysis of a solution phase sample containing 200 mg polymer in 2 ml solvent (FT) or thermal gravimetric analysis of a solid phase sample containing 50 mg polymer (TGA);
[b]flow experiments were carried out at a flow rate of 0.167 ml/min in a 10 ml reactor, leading to an average residence time of 60 min For comparison, one of the examples above, PMA, was desulfurised in a solution phase thermolysis under batch conditions and also in a two-step flow process (step 1: polymerisation, step 2: thermolysis). For batch thermolysis, PMA was synthesised also in batch, on a microwave reactor, and the resulting polymer solution was split in three equal fractions (see Table 2). The first fraction, Batch-1, was precipitated following standard procedures and then re-dissolved in toluene and heat treated at the same conditions as the flow process. The second fraction, Batch-2, was not purified by precipitation, but reacted on further without treatment; these are effectively the same conditions as the two-step flow process, FT-2. To the third fraction, Batch-3, additional monomer was added before heat treatment, in order to investigate the effect of incomplete conversion of monomer during the polymerisation on the thermolysis step. It can be seen from Table 4, that in both batch and flow thermolysis of PMA, the polymer characteristics do not change drastically, when the polymer is purified after polymerisation (FT-1 and Batch-1). The values for PDI are close to identical and $M_n$ decreases by <1000 g/mol. These figures do not change, when the polymer is not purified by precipitation in between the two processing steps (Batch-2 and FT-2). This observation does not appear to be surprising, given that the polymerisation under the bespoke conditions goes to near completion, leaving only very small amounts of unreacted monomer in the polymer solution. This changes significantly, when fresh monomer is added (Batch-3); here the PDI increases by a very large extend to >2 and $M_n$ decreases to almost half its initial value after the high temperature treatment. These figures lead to the conclusion that while trace amounts of monomer do not significantly influence the polymer characteristics in a subsequent thermolysis step, large amounts will, with one potential reason being polymerisation of the monomer at the high temperatures and the presence of radicals formed at these temperatures. It is interesting to notice that the batch thermolysis reactions resulted in lower conversions than the corresponding flow process, by 20-30%. In conclusion, it can be stated that RAFT polymerisation with subsequent desulfurisation via high temperature thermolysis can be conveniently performed in an integrated two-step continuous flow process without the need to isolate and purify intermediates, given that the polymerisation is designed to result in high conversions.

TABLE 2

Experimental conditions and results for solution phase thermolysis of PMA, comparison between batch, single-step and two-step flow processing

| method[a] | sample preparation[b] | conv. [%][c] | $M_n$ [g/mol] (before)[d] | $M_n$ [g/mol] (after)[d] | PDI [—] (before)[e] | PDI [—] (after)[e] |
|---|---|---|---|---|---|---|
| FT-1 | work-up | 96/87 | 8300 | 7400 | 1.24 | 1.25 |
| FT-2 | — | 97/85 | — | 7700 | — | 1.29 |
| Batch-1 | work-up | 97/54 | 9900 | 9100 | 1.33 | 1.33 |

TABLE 2-continued

Experimental conditions and results for solution phase thermolysis of PMA, comparison between batch, single-step and two-step flow processing

| method[a] | sample preparation[b] | conv. [%][c] | $M_n$ [g/mol] (before)[d] | $M_n$ [g/mol] (after)[d] | PDI [—] (before)[e] | PDI [—] (after)[e] |
|---|---|---|---|---|---|---|
| Batch-2 | no work-up | 97/64 | 9900 | 9200 | 1.33 | 1.33 |
| Batch-3 | +monomer | 97/56 | 9900 | 5100 | 1.33 | 2.23 |

[a]processing method: solution phase thermolysis in toluene as single-step flow thermolysis (FT-1), two-step flow polymerisation and thermolysis (FT-2) or batch thermolysis; molar ratio of monomer to RAFT-agent to initiator: 100/1.2/0.3, monomer: MA (concentration 3.0 mol/l), RAFT-agent: 1c, initiator: ACHN, temperature: 230° C., reaction time: 1 h;
[b]sample preparation before thermolysis (after polymerisation) consisted either of a conventional precipitation of the polymer solution after polymerisation (work-up), no treatment at all (no work-up) or no precipitation and addition of 400 mg monomer (+monomer) on 1.5 ml polymer solution;
[c]reaction conversion of polymerisation/thermolysis;
[d]molecular weight before and after thermolysis;
[e]PDI before and after thermolysis Experimental Section:
Synthesis of RAFT Polymers The following procedure is typical. A starting material solution of 1291 mg monomer (MMA), 11 mg initiator (ACHN), 75 mg RAFT agent 1d, in 3.65 ml toluene, was premixed and degassed using nitrogen purging. Because of the low solubility of the RAFT agent in toluene, it was first dissolved in the monomer, and then toluene and initiator were added. The polymerization was conducted on a laboratory microwave reactor (Biotage Initiator) at 110° C. with a reaction time of 2 h. A pink-red viscous polymer solution was obtained after reaction, from which conversion was determined by NMR. Following solvent removal and re-dissolving in dichloromethane, the product was precipitated in methanol, resulting in a pink polymer powder, 2d, after filtration (see Table 1 and FIGS. 8 and 10).

Single-Step Flow Thermolysis

The following procedure is typical. A starting material solution of 200 mg polymer 2d, (PMMA) in 2 ml toluene, was premixed and degassed using nitrogen purging. The thermolysis was conducted on a Vapourtec R2/R4 flow reactor system using a 10 ml stainless steel reactor coil (ID: 1 mm). The reaction temperature was set to 220° C. and the flow rate to 0.167 ml/min resulting in a reaction time of 1 h. A 250 psi backpressure regulator was positioned inline after the reactor coil in order to prevent solvent from boiling off. The 2 ml sample was injected into the reactor via a sample loop, which was flushed with a constant stream of toluene. In case the sample volume exceeds 5 ml, it can alternatively be delivered straight through the pump (see FIG. 1). A dark red polymer solution was obtained after reaction. Following solvent removal and re-dissolving in dichloromethane, the product was precipitated in methanol, resulting in a white polymer powder after filtration. After work-up, the conversion was determined by NMR. For determination of suitable thermolysis conditions, thermal gravimetric analysis (TGA) experiments at increasing temperature and at isothermal conditions were performed before the flow experiment. In the first case, a 50 mg sample of polymer was heated from 40 to 500° C. at a rate of 10 K/min; in the second case, a 50 mg sample of polymer was heated at the optimal thermolysis temperature, determined by the first experiment (for PMMA: 220° C.), under isothermal conditions for 180 min.

Two-Step Flow Thermolysis

The following procedure is typical. A starting material solution of 751 mg monomer (MMA), 7.3 mg initiator (ACHN), 20 mg RAFT agent 1d, in 1.7 ml toluene, was premixed and degassed using nitrogen purging. Both, polymerisation and thermolysis were conducted on a Vapourtec R2/R4 flow reactor system using a set of steel reactor coils (ID: 1 mm), operated in series (see FIG. 4). The polymerisation was performed in one or two 10 ml coils in series, heated to 110° C., and the thermolysis in one 5 ml coil, heated to 220° C. The flow rate was set to 0.083 ml/min resulting in a reaction time of 2 or 4 h for the polymerisation and 1 h for the thermolysis. A 250 psi backpressure regulator was positioned inline after the third reactor coil in order to prevent solvent from boiling off. The 2 ml sample was injected into the reactor via a sample loop, which was flushed with a constant stream of toluene. In case the sample volume exceeds 5 ml, it can alternatively be delivered straight through the pump (see FIG. 4). A dark red polymer solution was obtained after reaction. Following solvent removal and re-dissolving in dichloromethane, the product was precipitated in methanol, resulting in a white polymer powder after filtration. After work-up, the conversion was determined by NMR.

Batch Thermolysis (Comparative)

The following procedure is typical. 1.5 ml of polymer solution (PMA), containing 400 mg polymer in toluene, was degassed using nitrogen purging (Table 2, Batch-2). The thermolysis was conducted on a laboratory microwave reactor (Biotage Initiator) at 230° C. with a reaction time of 1 h. A yellow brown polymer solution was obtained after reaction. Following solvent removal and re-dissolving in dichloromethane, the product was precipitated in petroleum benzene (60-80), resulting in a yellow polymer oil after solvent removal. After work-up, the conversion was determined by NMR. Alternative batch thermolysis reactions were carried out, where the polymer product was precipitated after polymerisation (Table 2, Batch-1) or where 400 mg of monomer were added before thermolysis (Table 2, Batch-3).

Example 2

Figure 11:
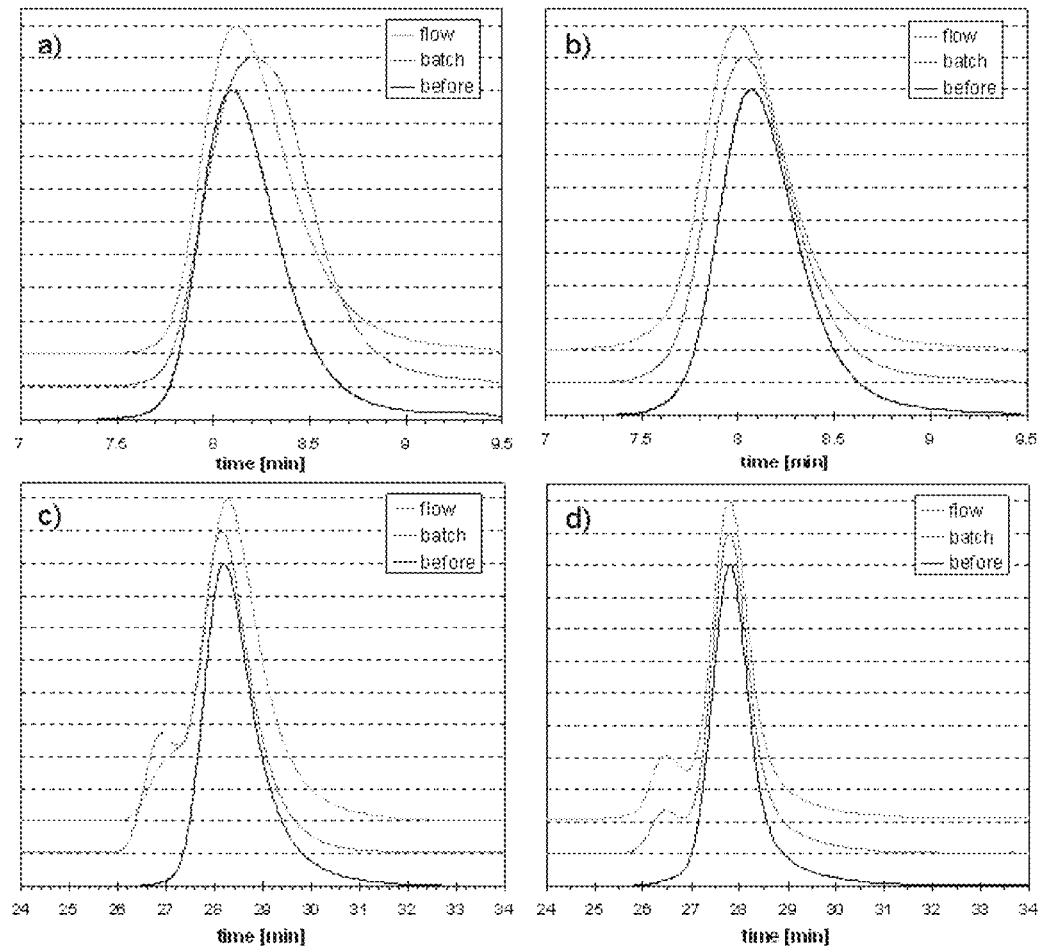
FIG. 11 shows GPC chromatograms for (a) poly-DMA 3a, (b) poly-NIPAM 3b, (c) poly-MMA 3c, (d) polystyrene 3d, comparing each polymer before thiocarbonylthio group removal with its corresponding samples after the flow and batch processes; chromatograms (a) and (b) were taken on a DMAc GPC, chromatograms (c) and (d) on a THF GPC (see supporting information); peak heights were normalized.
Figure 12:
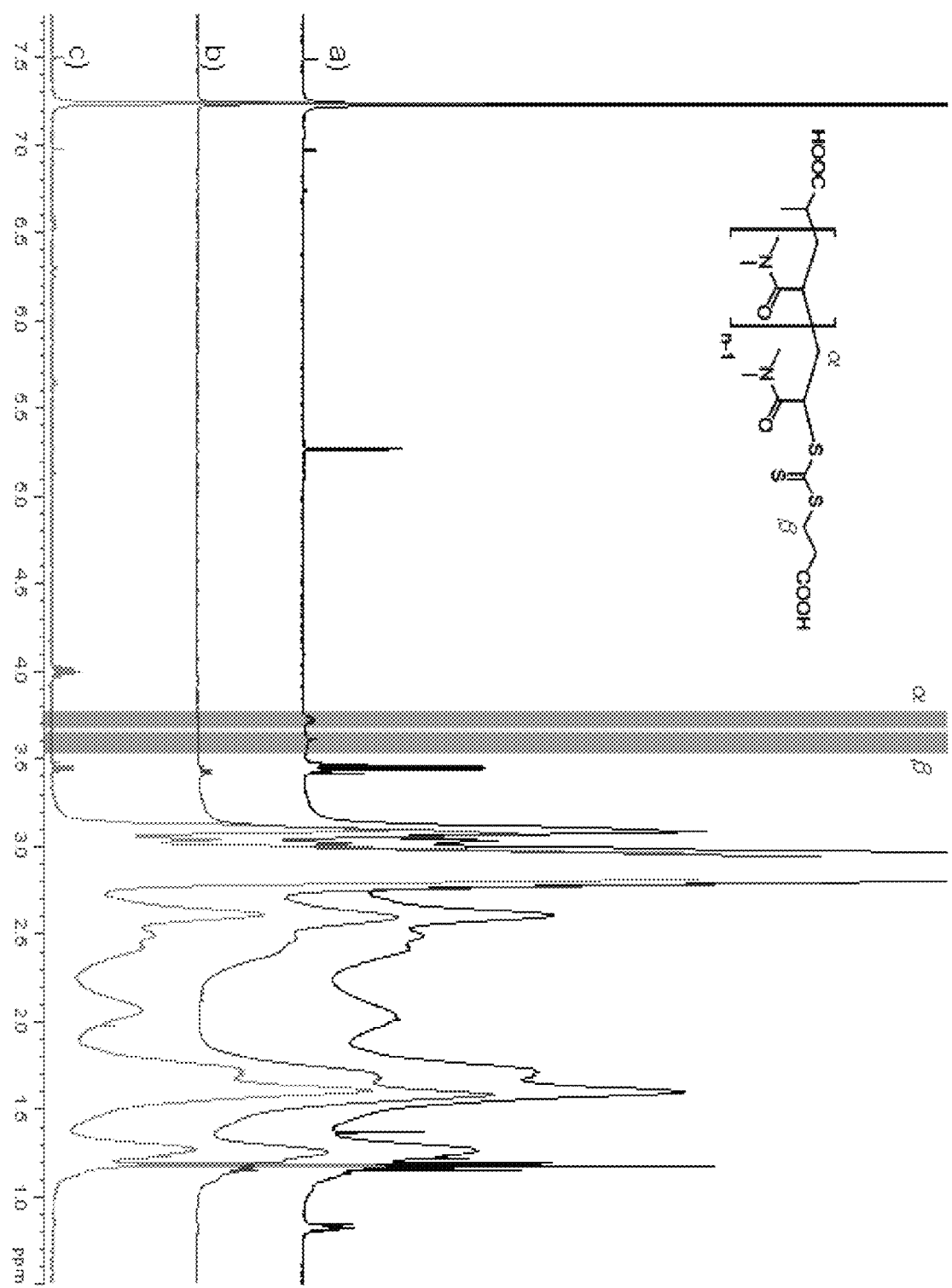
FIG. 12 shows 1H NMR spectra of poly-DMA, 3a, before (a) and after thiocarbonylthio group removal in batch (b) or continuous flow (c). Conversion was determined by the proton signals $\alpha$ and $\beta$ on the —CH2— groups, situated within the polymer backbone adjacent to the thiocarbonylthio group or within the thiocarbonylthio group.

Continuous Flow Process for the Removal of Thiocarbonylthio Groups from RAFT Polymers Via Radical Induced Reduction Using Hypophosphite A continuous flow process was designed for a radical induced reduction using hypophosphite, which is removing the thiocarbonylthio group of polymers made by controlled radical polymerization. ACHN and AMHP initiators were used as the radical source and EPHP as the H-atom source (see Scheme 4). This process was tested using a series of different monomers, including acrylamides, methyl methacrylate and styrene polymerized via the RAFT approach at temperatures between 70 and 100° C., using several different chain transfer agents, solvents and radical initiators. The subsequent radical induced end group removal process was carried out in a steel tube flow reactor system at 100° C. in organic solvents or water, depending on the solubility of the polymer. After the end group removal process, the polymers exhibited low polydispersities between 1.03 and 1.19, and average molecular weights between 7500 and 22800 g/mol. Comparative batch studies were undertaken on a batch microwave reactor, and both flow and batch results are presented in Table 3. FIG. 11 shows GPC results of polymers 2a-d before and after end group removal, for both, batch and flow process, and FIG. 12 shows NMR spectra before and after end group removal.

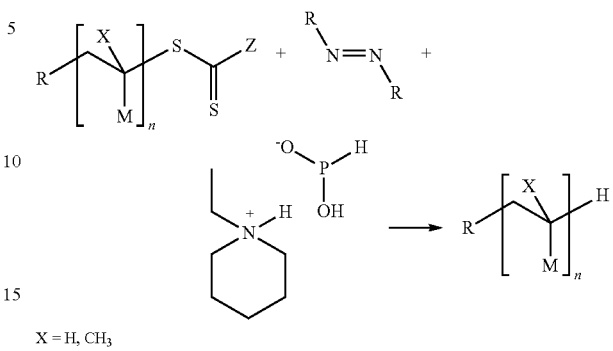

Scheme 4. Radical induced reduction using hypophospite for the removal of thiocarbonylthio groups from RAFT polymers.

X = H, CH$_3$

TABLE 3

Conditions and reagents for RAFT end group removal performed on a continuous flow reactor or a microwave induced batch reactor.

| polymer | processing method[a] | solvent[b] | conv. [%] | $M_n$[c] [g/mol] | PDI [−] |
|---|---|---|---|---|---|
| 3a | batch | MeCN | ~100 | 18000 | 1.03 |
|  | flow | MeCN | ~100 | 18200 | 1.03 |
| 3b | batch | MeCN | ~100 | 22400 | 1.06 |
|  | flow | MeCN | ~100 | 22800 | 1.06 |
| 3c | batch | toluene | 62 | 8600 | 1.19 |
|  | flow | toluene | 66 | 7500 | 1.18 |
| 3d | batch | toluene | ~100 | 9500 | 1.13 |
|  | flow | toluene | 92 | 9900 | 1.15 |

TABLE 3-continued

Conditions and reagents for RAFT end group removal performed on a continuous flow reactor or a microwave induced batch reactor.

| polymer | processing method[a] | solvent[b] | conv. [%] | $M_n$[c] [g/mol] | PDI [-] |
|---|---|---|---|---|---|
| 3e 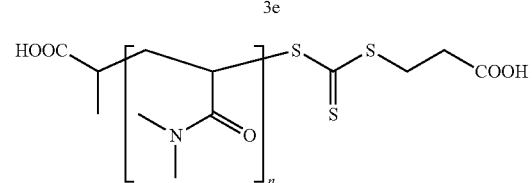 | batch | water | ~100 | 11200 | 1.05 |
|  | flow | water | ~100 | 11700 | 1.04 |

[a] all reactions were performed at 100° C. for 2 h;
[b] the following initiators were used for the RAFT end group removal of the polymers: 3a-d-ACHN, 3e-AMHP;
[c] average molecular weights were measured in poly-MMA equivalents for 3a, b, c & e and in polystyrene equivalents for 3d.

Experimental Section:
Synthesis of RAFT Polymers

The following procedure is typical. A starting material solution of 1239 mg monomer (DMA), 5.4 mg initiator (AMHP), 48 mg RAFT agent (4-cyano-4-(dodecyl-thiocarbono-thioylthio)pentanoic acid), in 5 ml water, was premixed and degassed using nitrogen purging. The polymerization was conducted on a laboratory microwave reactor (Biotage Initiator) at 80° C. with a reaction time of 2 h. A yellow viscous polymer solution was obtained after reaction, from which conversion was determined by NMR. Following solvent removal and re-dissolving in dichloromethane, the product was precipitated in diethyl ether, resulting in a yellow polymer powder, 3a, after filtration.

Radical-Induced RAFT End Group Removal

The following procedure is typical. A starting material solution of 300 mg polymer 3a, (poly DMA), 4 mg initiator (ACHN), 45 mg hypophosphite (EPHP), in 2 ml MeCN, was premixed and degassed using nitrogen purging. The radical induced end group removal was conducted either on a laboratory microwave reactor (Biotage Initiator) or on a Vapourtec R2/R4 flow reactor system using two 10 ml stainless steel reactor coils in series (ID: 1 mm, total reactor volume: 20 ml). In both cases, the reaction temperature was set to 100° C. and the reaction time to 2 h. For the flow reaction, the pump flow rate was set to 0.167 ml/min and a 100 psi backpressure regulator was positioned inline after the reactor coil in order to prevent solvent from boiling off. The 2 ml sample was injected into the reactor via a sample loop, which was flushed with a constant stream of MeCN. A clear polymer solution was obtained after reaction, which was worked up by aqueous dialysis at room temperature, using a 9 cm dialysis tubing (Spectra Por3, MWCO=3500 g/mol). Following solvent removal and re-dissolving in dichloromethane, the product was precipitated in diethyl ether, resulting in a white polymer powder, after filtration. After work-up, the conversion was determined by NMR.

Example 3

Continuous Flow Process for the Removal of Thiocarbonylthio Groups from RAFT Polymers Via Aminolysis The continuous production of narrow molecular weight distribution thiocarbonylthio-free RAFT polymer using aminolysis was performed in either a single or a two-step flow process using either a liquid source of amine or polymer supported amine. The single-step process uses previously synthesised polymer as feedstock (FIG. 3), while the two-step process uses monomer solution as feedstock: In the first stage the monomer solution containing monomer, RAFT agent, initiator and solvent are polymerized to form a RAFT polymer containing a thiocarbonylthio end group. In the second stage, this end group is modified via an aminolysis step, using either a liquid amine, such as in FIG. 5 (top) or a polymer supported amine, such as in FIG. 5 (bottom). The two steps can be performed in series with or without purification in between. If the polymer is purified after polymerization, and excess monomer is removed, the subsequent aminolysis step will result in a colourless and odourless polymer containing a terminal thiol functionality, which can be reacted further, such as in conjugation to biomolecules, covalent binding to surfaces or other. If the polymer is not purified after polymerization and enough unreacted monomer is present in the solution, the aminolysis step will lead to the formation of a colour- and odourless polymer with an unreactive thioether end group (see Scheme 5).

This process was tested using a series of different monomers, including DMA, NIPAM, and HPMA, which were polymerized at 80° C. The subsequent end group modification process was carried out in a steel tube flow reactor using liquid amines or a glass column filled with a packed bed of polymer supported amine at temperatures between 60 to 80° C. After the aminolysis process, the polymers exhibited low polydispersities between 1.08 and 1.18.

Scheme 5. Aminolysis of RAFT polymers for the removal of thiocarbonylthio end groups, top: purification (removal of unreacted monomer) after polymerization results in terminal thiol group; bottom: no purification (presence of residual monomer during aminolysis) results in a terminal thioether group.

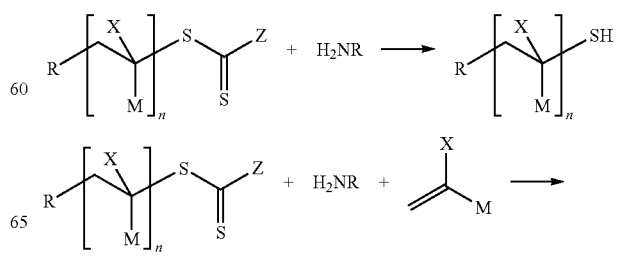

-continued

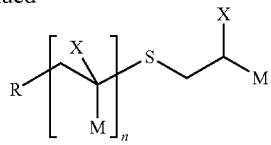

X = H, CH₃

TABLE 4

Conditions and reagents for RAFT end group removal performed on a continuous flow reactor using either liquid or polymer supported amines

| polymer[a] | amine | flow rate, $T_{polymerisation}$ | PDI | conv.[b] |
|---|---|---|---|---|
| PNIPAM | Quadrapure BZA 60 eq | 0.1 ml/min, 80° C. | 1.16 | ~17% |
| PNIPAM | DETA 60 eq + sand | 0.1 ml/min, 80° C. | — | ~45% |
| PNIPAM | DETA 180 eq + sand | 0.1 ml/min, 80° C. | 1.15 | ~90% |
| PDMA | DETA 180 eq + sand | 0.1 ml/min, 80° C. | 1.15 | 60% |
| PDMA | Hexylamine 8 eq | 0.33 ml/min, 60° C. | 1.18 | 100% |
| PHPMA | DETA 180 eq + sand | 0.1 ml/min, 80° C. | 1.14 | 90% |

[a]all polymers were synthesized using using RAFT agent 1c and AIBN as the initiator,
[b]monomer conversion was determined by NMR.

TABLE 5

Conditions and reagents for RAFT polymerization and end group removal (two-step process) performed on a continuous flow reactor system using either liquid or polymer supported amines.

| polymer[a] | amine | flow rate(s), $T_{polymerisation}$, $T_{aminolysis}$ | PDI | $M_n$ [g/mol] | conv. amin.[b] | conv. polym.[c] |
|---|---|---|---|---|---|---|
| PDMA | Hexylamine 1M | 2 × 0.167 ml/min, 80° C., 60° C. | 1.10 | 5304 | 100% | 90% |
| PDMA | DETA 180eq + sand 1:1 | 0.167 ml/min, 80° C., 80° C. | 1.16 | 5220 | 63% | 93% |
| PNIPAM | Hexylamine 1M | 2 × 0.111 ml/min, 80° C., 60° C. | 1.08 | 6427 | 100% | 82% |
| PNIPAM | DETA 180eq + sand 1:1 | 0.111 ml/min, 80° C., 80° C. | 1.10 | 6068 | 32% | 89% |
| PHPMA | Hexylamine 1M | 2 × 0.066 ml/min, 80° C., 80° C. | 1.14 | 6847 | 100% | 72% |
| PHPMA | DETA 180eq + sand 1:1 | 0.066 ml/min, 80° C., 80° C. | 1.13 | 6400 | 72% | 56% |

[a]all polymers were synthesized using using RAFT agent 1c and AIBN as the initiator,
[b]monomer conversion of polymerization step was determined by NMR,
[c]conversion of aminolysis step was determined by UV and confirmed by NMR.

Experimental Section:
Synthesis of RAFT Polymers

The following procedure is typical. A starting material solution of 3271 mg monomer (DMA), 16.1 mg initiator (AIBN), 199.8 mg RAFT agent 1c, in 9.04 g MeCN, was premixed and degassed using nitrogen purging. The polymerization was conducted on a laboratory microwave reactor (Biotage Initiator) at 80° C. with a reaction time of 2 h. A yellow viscous polymer solution was obtained after reaction, from which conversion was determined by NMR. Following solvent removal and re-dissolving in dichloromethane, the product was precipitated in diethyl ether, resulting in a yellow polymer powder, after filtration Flow Aminolysis Using Liquid Amines The following procedure is typical. A starting material solution of 100 mg polymer, (PDMA, Table 4) and 6 mg hexylamine in 1 ml MeCN, was premixed and degassed using nitrogen purging. The aminolysis was conducted on a Vapourtec R2/R4 flow reactor system using a 10 ml stainless steel reactor coil (ID: 1 mm). The reaction temperature was set to 60° C. and the flow rate to 0.333 ml/min resulting in a reaction time of 30 minutes. A 100 psi backpressure regulator was positioned inline after the reactor coil in order to prevent solvent from boiling off. The 1 ml sample was injected into the reactor via a sample loop, which was flushed with a constant stream of MeCN. In case the sample volume exceeds 5 ml, it can alternatively be delivered straight through the pump (see FIG. 3, top). A colourless polymer solution was obtained after reaction. Following solvent removal and re-dissolving in dichloromethane, the product was precipitated in diethyl ether, resulting in a white polymer powder, after filtration. After work-up, the conversion was determined by NMR and UV and polydispersity index (DPI) and average molecular weight were determined by GPC.

Flow Aminolysis Using Polymer Supported Amines

The following procedure is typical. 100 mg polymer, (PDMA, Table 4) in 1 ml MeCN, was premixed and degassed using nitrogen purging. The aminolysis was conducted on a Vapourtec R2/R4 flow reactor system using a column filled with 250 mg DETA mixed with 250 mg sand. The reaction temperature was set to 80° C. and the flow rate to 0.100 ml/min. A 100 psi backpressure regulator was positioned inline after the reactor coil in order to prevent solvent from boiling off. The 1 ml sample was injected into the reactor via a sample loop, which was flushed with a constant stream of MeCN. In case the sample volume exceeds 5 ml, it can alternatively be delivered straight through the pump (see FIG. 3, bottom). A colourless polymer solution was obtained after reaction. Following solvent removal and re-dissolving in dichloromethane, the product was precipitated in diethyl ether, resulting in a white polymer powder, after filtration. After work-up, the conversion was determined by NMR and UV and polydispersity index (DPI) and average molecular weight were determined by GPC.

Two Step Flow Process Using Liquid Amines (No Purification after Polymerization)

The following procedure is typical. A starting material solution of 436 mg monomer N,N-dimethylacrylamide (DMA), 2.15 mg initiator (AIBN), 26 mg RAFT agent 1c, in 1.2 g MeCN, was premixed and degassed using nitrogen purging. A second sample, consisting of 2 ml degassed 1M hexylamine solution in MeCN, was added after the polymerization. Both, polymerization and aminolysis were conducted on a Vapourtec R2/R4 flow reactor system using a set of steel reactor coils (ID: 1 mm), operated in series (see FIG. 5, top). The polymerization was performed in one 10 ml coils, heated to 80° C., and the aminolysis in one 10 ml coil, heated to 60° C. The flow rate was set to 0.167 ml/min each resulting in a reaction time of 1 h for the polymerization and 30 minutes for the aminolysis. A 100 psi backpressure regulator was positioned inline after the second reactor coil in order to prevent solvent from boiling off. Here, the 2 ml samples were injected into the reactor via sample loops, which were flushed with a constant stream of MeCN. In cases where the sample volumes exceed 5 ml, they can alternatively be delivered straight through the pump (see FIG. 5, top). A colorless polymer solution was obtained after reaction. Following solvent removal and re-dissolving in dichloromethane, the product was precipitated in diethyl ether, resulting in a white polymer powder after filtration. After work-up, the conversion was determined by NMR and UV and polydispersity index (DPI) and average molecular weight were determined by GPC.

Two Step Flow Process Using Polymer Supported Amines (No Purification after Polymerization)

The following procedure is typical. A starting material solution of 218 mg monomer (DMA), 1.1 mg initiator (AIBN), 13.3 mg RAFT agent 1c, in 0.6 g MeCN, was premixed and degassed using nitrogen purging. Both, polymerization and aminolysis were conducted on a Vapourtec R2/R4 flow reactor system (see FIG. 5, bottom). The polymerization was performed in a 10 ml steel reactor coil (ID: 1 mm), heated to 80° C., and the aminolysis was conducted on a reactor glass column filled with 900 mg DETA (see FIG. 5, bottom) mixed with 900 mg sand, and was heated to 80° C. The flow rate was set to 0.167 ml/min resulting in mean reaction time inside the reactor coil used for polymerisation of 60 minutes. A 100 psi backpressure regulator was positioned inline after the column in order to prevent solvent from boiling off. Here, the 1 ml sample was injected into the reactor via a sample loop, which was flushed with a constant stream of MeCN. In case the sample volume exceeds 5 ml, it can alternatively be delivered straight through the pump (see FIG. 5, bottom). A colorless polymer solution was obtained after reaction. Following solvent removal and re-dissolving in dichloromethane, the product was precipitated in diethyl ether, resulting in a white polymer powder after filtration. After work-up, the conversion was determined by NMR and UV and polydispersity index (DPI) and average molecular weight were determined by GPC.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Many modifications will be apparent to those skilled in the art without departing from the scope of the present invention.

The invention claimed is:

1. A process for removing thiocarbonylthio groups from a polymer prepared by RAFT polymerisation, the process comprising:
   introducing into bundled flow lines or a coiled flow line of a tubular flow reactor a solution comprising a RAFT polymer in solvent;
   and promoting a reaction within the flow reactor that removes the thiocarbonylthio groups so as to form a solution that flows out of the reactor comprising the RAFT polymer absent the thiocarbonylthio groups, wherein the reaction within the flow reactor that removes the thiocarbonylthio groups is promoted by:
   (i) increasing the temperature of the solution comprising the RAFT polymer to remove the thiocarbonylthio groups by thermolysis;
   (ii) irradiating the solution comprising the RAFT polymer; or
   (iii) introducing a reagent into the solution comprising the RAFT polymer, wherein,
      (a) the reagent is provided in the form of a solution and is introduced into the solution comprising the RAFT polymer; or
      (b) the reagent is provided on a solid support and the solution comprising the RAFT polymer is passed over the solid support.

2. The process according to claim 1, wherein the flow reactor is in the form of a capillary tubular flow reactor.

3. The process according to claim 1, wherein the flow reactor comprises one or more flow lines through which the solution comprising the RAFT polymer passes, the one or more flow lines having an internal diameter of about 1 mm.

4. The process according to claim 1, wherein up to 90% of thiocarbonylthio groups are removed from the RAFT polymer.

5. The process according to claim 1, wherein the polymer prepared by RAFT polymerisation is formed by introducing into a flow reactor reaction solution comprising one or more ethylenically unsaturated monomers, RAFT agent, solvent and free radical initiator; and promoting RAFT polymerisation of the one or more ethylenically unsaturated monomers so as to form within the flow reactor a solution comprising the RAFT polymer in solvent.

6. The process according to claim 5, wherein RAFT agent is represented by general formula (II) or (III):

(II)

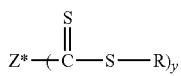

where Z and R are groups, and R* and Z* are x-valent and y-valent groups, respectively, that are independently selected such that the agent can function as a RAFT agent in the polymerisation of the one or more ethylenically unsaturated monomers; x is an integer ≥1; and y is an integer ≥2.

7. The process according to claim 6, wherein R is selected from optionally substituted, and in the case of R* a x-valent form of optionally substituted: alkyl, alkenyl, alkynyl, aryl, acyl, carbocyclyl, heterocyclyl, heteroaryl, alkylthio, alkenylthio, alkynylthio, arylthio, acylthio, carbocyclylthio, heterocyclylthio, heteroarylthio, alkylalkenyl, alkylalkynyl, alkylaryl, alkylacyl, alkylcarbocyclyl, alkylheterocyclyl, alkylheteroaryl, alkyloxyalkyl, alkenyloxyalkyl, alkynyloxyalkyl, aryloxyalkyl, alkylacyloxy, alkylcarbocyclyloxy, alkylheterocyclyloxy, alkylheteroaryloxy, alkylthioalkyl, alkenylthioalkyl, alkynylthioalkyl, arylthioalkyl, alkylacylthio, alkylcarbocyclylthio, alkylheterocyclylthio, alkylheteroarylthio, alkylalkenylalkyl, alkylalkynylalkyl, alkylarylalkyl, alkylacylalkyl, arylalkylaryl, arylalkenylaryl, arylalkynylaryl, arylacylaryl, arylacyl, arylcarbocyclyl, arylheterocyclyl, arylheteroaryl, alkenyloxyaryl, alkynyloxyaryl, aryloxyaryl, alkylthioaryl, alkenylthioaryl, alkynylthioaryl, arylthioaryl, arylacylthio, arylcarbocyclylthio, arylheterocyclylthio, arylheteroarylthio, and a polymer chain.

8. The process according to claim 6, wherein Z is selected from optionally substituted, and in the case of Z* a y-valent form of optionally substituted: F, Cl, Br, I, alkyl, aryl, acyl, amino, carbocyclyl, heterocyclyl, heteroaryl, alkyloxy, aryloxy, acyloxy, acylamino, carbocyclyloxy, heterocyclyloxy, heteroaryloxy, alkylthio, arylthio, acylthio, carbocyclylthio, heterocyclylthio, heteroarylthio, alkylaryl, alkylacyl, alkylcarbocyclyl, alkylheterocyclyl, alkylheteroaryl, alkyloxyalkyl, aryloxyalkyl, alkylacyloxy, alkylcarbocyclyloxy, alkylheterocyclyloxy, alkylheteroaryloxy, alkylthioalkyl, arylthioalkyl, alkylacylthio, alkylcarbocyclylthio, alkylheterocyclylthio, alkylheteroarylthio, alkylarylalkyl, alkylacylalkyl, arylalkylaryl, arylacylaryl, arylacyl, arylcarbocyclyl, arylheterocyclyl, arylheteroaryl, aryloxyaryl, arylacyloxy, arylcarbocyclyloxy, arylheterocyclyloxy, arylheteroaryloxy, alkylthioaryl, arylthioaryl, arylacylthio, arylcarbocyclylthio, arylheterocyclylthio, arylheteroarylthio, dialkyloxydiheterocyclyloxy- or diaryloxy-phosphinyl, dialkyl-, diheterocyclyl- or diaryl-phosphinyl, cyano (i.e. —CN), and —S—R, where R is as defined in claim 6.

9. The process according to claim 1, wherein the solution introduced into the tubular flow reactor is degassed to remove oxygen.

* * * * *